(12) United States Patent
Santurri et al.

(10) Patent No.: US 9,023,553 B2
(45) Date of Patent: May 5, 2015

(54) MULTILAYERED COMPOSITE PROTON EXCHANGE MEMBRANE AND A PROCESS FOR MANUFACTURING THE SAME

(75) Inventors: Pasco R. Santurri, Mentor, OH (US); James H. Duvall, Reno, NV (US); Denise M. Katona, Perry, OH (US); Joseph T. Mausar, Mentor, OH (US); Berryinne Decker, Mayfield Heights, OH (US)

(73) Assignee: Chemsultants International, Inc., Mentor, OH (US)

( * ) Notice: Subject to any disclaimer, the term of this patent is extended or adjusted under 35 U.S.C. 154(b) by 1445 days.

(21) Appl. No.: 12/231,501

(22) Filed: Sep. 3, 2008

(65) Prior Publication Data

US 2009/0176141 A1    Jul. 9, 2009

Related U.S. Application Data

(60) Provisional application No. 60/967,547, filed on Sep. 4, 2007.

(51) Int. Cl.
*H01M 8/10*    (2006.01)

(52) U.S. Cl.
CPC .......... *H01M 8/1023* (2013.01); *H01M 8/1027* (2013.01); *H01M 8/1032* (2013.01);
(Continued)

(58) Field of Classification Search
USPC ................................. 429/491, 492, 493, 494
See application file for complete search history.

(56) References Cited

U.S. PATENT DOCUMENTS 4,455,210 A    6/1984    Coker et al.

4,604,323 A    8/1986    Johnson
(Continued)

FOREIGN PATENT DOCUMENTS

DE    10338404    4/2005
JP    2006059698    3/2006
(Continued)

OTHER PUBLICATIONS

J. Mausar and S. Keinath. 2006 DOE Hydrogen Program Center for Intelligent Fuel Cell Material Design Phase 1, Project ID # FCP-1, May 16, 2006, 1-16.*
(Continued)

*Primary Examiner* — Carlos Barcena
(74) *Attorney, Agent, or Firm* — D. Peter Hochberg; Sean F. Mellino

(57) ABSTRACT

A multilayered membrane for use with fuel cells and related applications. The multilayered membrane includes a carrier film, at least one layer of an undoped conductive polymer electrolyte material applied onto the carrier film, and at least one layer of a conductive polymer electrolyte material applied onto the adjacent layer of polymer electrolyte material. Each layer of conductive polymer electrolyte material is doped with a plurality of nanoparticles. Each layer of undoped electrolyte material and doped electrolyte material may be applied in an alternating configuration, or alternatively, adjacent layers of doped conductive polymer electrolyte material is employed. The process for producing a multilayered composite membrane includes providing a carrier substrate and solution casting a layer of undoped conductive polymer electrolyte material and a layer of conductive polymer electrolyte material doped with nanoparticles in an alternating arrangement or in an arrangement where doped layers are adjacent to one another.

66 Claims, 9 Drawing Sheets

(52) U.S. Cl.
CPC .......... *H01M8/1039* (2013.01); *H01M 8/1048* (2013.01); *H01M 8/1051* (2013.01); *H01M 8/1053* (2013.01); *H01M 8/106* (2013.01); *H01M 8/1067* (2013.01); *H01M 8/1081* (2013.01); *Y02E 60/523* (2013.01); *Y02E 60/522* (2013.01)

(56) References Cited

U.S. PATENT DOCUMENTS

| | | | |
|---|---|---|---|
| 5,654,109 | A | 8/1997 | Plowman et al. |
| 6,110,333 | A | 8/2000 | Spethmann et al. |
| 6,630,265 | B1 | 10/2003 | Taft, III et al. |
| 6,686,308 | B2 * | 2/2004 | Mao et al. .................. 502/180 |
| 7,052,793 | B2 | 5/2006 | Formato et al. |
| 7,108,935 | B2 | 9/2006 | Bauer et al. |
| 7,183,017 | B2 | 2/2007 | Taft, III et al. |
| 7,217,754 | B2 * | 5/2007 | Koloski et al. ............... 524/430 |
| 7,625,652 | B2 * | 12/2009 | Uensal et al. ................ 429/492 |
| 2002/0093008 | A1 | 7/2002 | Kerres et al. |
| 2003/0170521 | A1 | 9/2003 | Zhang |
| 2006/0034757 | A1 | 2/2006 | Yan et al. |
| 2006/0057464 | A1 | 3/2006 | Kim et al. |
| 2006/0166069 | A1 | 7/2006 | Min et al. |
| 2007/0128490 | A1 | 6/2007 | Li et al. |
| 2007/0275291 | A1 * | 11/2007 | Gu et al. ..................... 429/44 |
| 2010/0173224 | A1 * | 7/2010 | Schlenoff .................... 429/494 |

FOREIGN PATENT DOCUMENTS

| | | |
|---|---|---|
| JP | 2006147478 | 6/2006 |
| WO | WO 03/069712 | 8/2003 |

OTHER PUBLICATIONS

D.M. Katona. Center for Intelligent Fuel Cell Material Design Phase I, Project ID # FC25, May 16, 2007, 1-23.*

Farhat, Tarek F. and Hammond, Paula T.; "Fabrication of a "Soft" Membrane Electrode Assembly Using Layer-by-Layer Technology;" *Advanced Functional Materials*; vol. 16 (2006); pp. 433-444.

Hammond, Paula T.; "Recent Explorations in Electrostatic Multilayer Thin Film Assembly;" *Current Opinion in Colloid & Interface Science*; vol. 4 (2000); pp. 430-442.

Jena, Akshaya and Gupta, Krishna; "Characterization of Multi-Layered Porous Components of Batteries and Fuel Cells;" www.pmiapp.com/publications/docs/Characterization_of_multilayered_porous.pdf Sagidullin, Alexandr, et al.; "Water Diffusion through Asymmetric Polymer Membranes and Polyelectrolyte Multilayers;" *Diffusion Fundamentals*; vol. 2 (2005) pp. 131.1-131.2.

* cited by examiner

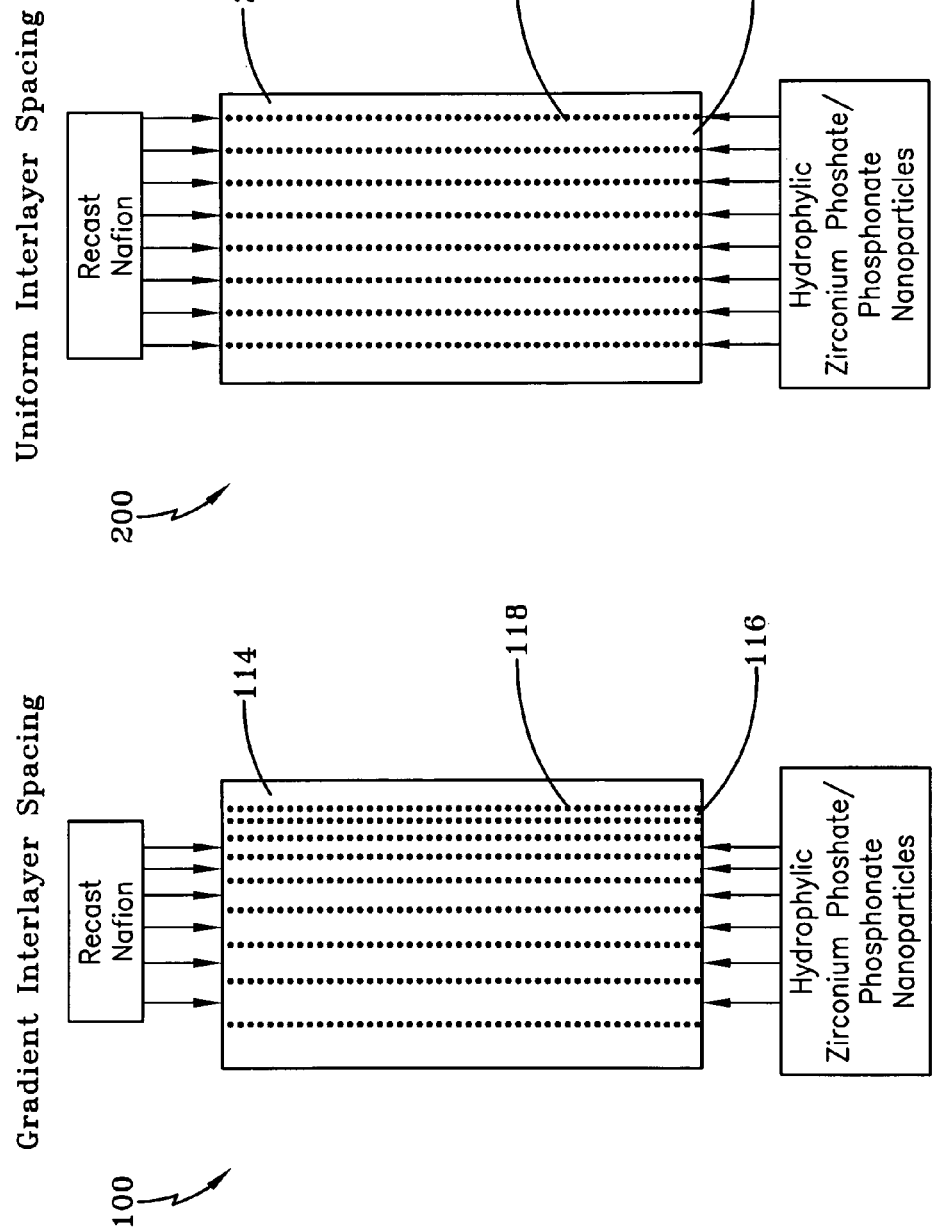

MULTILAYERED COMPOSITE PROTON EXCHANGE MEMBRANE AND A PROCESS FOR MANUFACTURING THE SAME

CROSS-REFERENCE TO RELATED APPLICATION

This application claims priority of U.S. Provisional Application No. 60/967,547, filed Sep. 4, 2007, under Title 35, United States Code, Section 119(e), which is incorporated by reference herein in its entirety.

STATEMENT OF GOVERNMENTAL SUPPORT

The invention described and claimed herein was made in part utilizing funds supplied by the U.S. Department of Energy under Contract No. DE-DG36-06GO86043. The government has certain rights in this invention.

FIELD OF THE INVENTION

The present invention generally relates to improved multilayered solid polymer electrolyte membranes and/or ion (cation) exchange membranes for use with fuel cells. More particularly, the present invention relates to a solution cast multilayer membrane, typically produced in a roll-to-roll casting process, having alternating multilayered conductive polymer coatings consisting of unfilled conductive polymers and conductive polymers filled with specialty materials, such as hydrophilic nanoparticles.

DESCRIPTION OF THE PRIOR ART

Proton exchange membrane (PEM) fuel cells are well known in the art. PEM fuel cells are known energy conversion devices for various applications, such as for providing portable power in automobile applications and for providing stationary power generation. It is anticipated that PEM fuel cells may ultimately play a critical role in the development of a hydrogen-based economy or industrial environment. However, various technical challenges exist in regards to the commercialization and use of PEM fuel cells.

It is known in the current art that for PEM fuel cell operation under conditions of relative high humidity, for example at a temperature (T) being less than or equal to 80° C., solubilized perfluorosulfonic acid (PFSA) proton conductors, such as NAFION® and GORE-SELECT®, may be employed due to their high conductivity and chemical/mechanical stability. Fuel cell operation with lightly humidified or dry gases at 120° C. would in turn be highly advantageous with regards to heat rejection from a fuel cell stack, compatibility with automotive radiators, tolerance to carbon monoxide (CO) impurities in the hydrogen gas stream and faster electrode kinetics. At such a high temperature and without pressurization of the feed gases, the hydrogen gas inlet relative humidity would be significantly less than 100%. It is typically considered that operation of a high temperature (i.e., about 120° C.) $H_2$/air fuel cell is ideal at a relative humidity of 25-50%.

However, one disadvantage of known systems is that the conductivity of solubilized perfluorosulfonic acid drops significantly at temperatures (T) greater than 100° C. under low humidity conditions due to an insufficient number of membrane-phase water molecules for dissociation of sulfonic acid groups, a loss of percolation pathways for proton movement due to membrane swelling and structural changes in the polymer which cause membrane pores to collapse. At high temperatures and low humidity, solubilized perfluorosulfonic acid membranes also exhibit a loss in mechanical strength (e.g., cracking and pinhole formation), increased gas permeability and higher rates of oxidative degradation.

Numerous different homogenous polymers and polymer composite materials, along with alternative membrane fabrication methodologies, have been investigated in the art to overcome the known poor performance of solubilized perfluorosulfonic acid membranes at high temperatures and low relative humidity. However, these known conventional methods fail to sufficiently overcome the aforementioned problems. Although water is generated at the fuel cell cathode during $H_2$/air fuel cell operation, there remains a need within the fuel cell to hydrate the anode side of the membrane electrode assembly (MEA). To achieve the necessary cathode-to-anode back-diffusion of water, the membrane thickness would have be to thinner than current membrane and MEA manufacturing capabilities allow. However, the use of ultra-thin membranes potentially causes unacceptable and undesirable oxygen and/or hydrogen (or other gas) crossover.

To prevent membrane drying under fuel cell operating conditions of high temperatures and low relative humidity, hydrophilic additives have been homogenously distributed throughout a proton exchange membrane material. Such an approach has shown promising results with improvement in fuel cell performance at high temperatures and relative humidity of 100%. However, such an approach has not proven successful at conditions of low relative humidity, i.e., at a relative humidity of about 20-25%. The current art appears to have an upper limit as to the amount of hydrophilic/nonconductive particles that can be added to a fuel cell membrane without losing conductivity and/or mechanical strength.

There is an unsatisfied need for an improved and easily manufactured in quantity membrane for use with fuel cells (or related applications) for facilitating membrane hydration at the anode under conditions of relative high temperature and low humidity. Current alternative membrane fabrication methodologies, have been investigated in the art, but are generally limited to a process for depositing a solution on a non-flexible glass plate or other substrate not suited for producing commercially viable quantities of membranes. For viable commercial applications, a roll-to-roll solution casting process to facilitate multiple process steps in a volume production scenario is preferred.

SUMMARY OF THE INVENTION

In accordance with the preferred embodiment of the present invention, there is provided an intelligent, discrete multilayer distribution of hydrophilic, nano-sized particles alternating either in uniform or gradient spaced solution cast layers with recast resolubilized perfluorosulfonic acid (PFSA) proton conductors for providing the continuous internal hydration of a membrane at the anode during fuel cell operation by using water generated at the fuel cell cathode. The nano-sized particles may include, for example, zirconium sulphophenyl phosphonate particles. In accordance with the present invention, the zirconium sulphophenyl phosphonate-based layers provide improved mechanical strength so that ultra-thin films (e.g., between 12-20 μm) can be used in a membrane electrode assembly (MEA). In turn, the overall production costs for an MEA would be reduced. The construction of composite proton exchange membranes made using alternating solution cast layers shows increased durability, improved conductivity over a wide range of relative humidities, improved water management, longer operating times and a reduction of methanol and other gas crossover. Additionally, the solution casting process provides for a wide latitude in rheological properties, including viscosity, which allow subsequent solution cast layers in the liquid (i.e., undried) state to flow more readily onto previous solution cast layers filling surface imperfections in the previous solution cast layer and resulting in superior in-situ performance of the solution cast multilayer membrane.

It should be appreciated that the composite solution cast membrane of the present invention may be employed as an electrolyte in conventional fuel cells and fuel cell applications. For example, it should be appreciated that the composite solution cast membrane of the present invention may be employed as or in the proton exchange membrane in electrochemical fuel cells and electrochemical fuel cell applications.

In accordance with the present invention, anode hydration through internal back-diffusion of water generated at the cathode occurs. In particular, by incorporating a thin layer of hygroscopic particles in the membrane near the cathode, it is possible to recapture most of the cathode water product via reabsorption into the proton exchange membrane. Likewise, the presence of multiple hydrophilic layers will redistribute reabsorbed water throughout the membrane via back diffusion. The present invention provides innovative solution cast solid polymer electrolyte membranes that are capable of operating at increased temperatures and pressures with lower relative humidity than those known in the art.

In addition, in accordance with the present invention, a rapid back diffusion flux of water is facilitated due to the overall membrane thickness being less than the conventional membranes of current fuel cells. The overall effect is a more uniform water distribution in the membrane and, in particular, better hydration of the anode-side of the PEM material. Although it is known that a bilayer membrane comprising sulfonated polyetheretherketone (PEEK) of different sulfonation degree exhibited a significant level of water back diffusion which allowed for continuous operation of a hydrogen fuel cell at 110° C. without reactant gas humidification for 900 hours, creating a solution cast multilayer membrane with highly hygroscopic layer spacing will amplify the rehydration capability of the MEA as compared to the bilayer membrane system.

In accordance with the present invention, a reduction in reactant gas crossover is realized. The creation of a thin PEM is relatively difficult due to the resultant increase of undesired crossover, i.e., permeation of reactant gases through the membrane, thereby causing a decrease in fuel efficiency, as well as safety concerns. The present invention of a solution cast multilayer membrane optimally eliminates, or at least significantly reduces, the issue of crossover by way of the presence of multiple zirconium sulphophenyl phosphonate-rich polymer layers wherein the in-plane oriented inorganic nano-platelets serve as a barrier to the permeating gases. Due to the very high surface proton conductivity of zirconium sulphophenyl phosphonate particles, the overall membrane conductivity will not be reduced.

In accordance with the present invention, improved mechanical strength of the hybrid multilayer film is realized. In particular, a reduction in membrane thickness typically results in a deleterious effect on the mechanical characteristics of the membrane. The present invention alleviates such issues by incorporating inorganic nano-sized zirconium sulphophenyl phosphonate fillers in discreet layers, whereby the particle concentration in each layer is high but the overall membrane loading of zirconium sulphophenyl phosphonate is relatively low. Thus, the pivotal difference between the multilayer PEM of the present invention and a conventional homogenous composite is that the morphology of the present invention is improved with the incorporation of various levels of the hygroscopic filler. Consequently, excessive swelling, brittleness and/or bad mechanical strength which is/are typical of standard composite membranes will be minimized, or even nonexistent, in the multilayer PEM's of the present invention.

Thus, it is expected, in accordance with the present invention, that the mechanical strength of the hybrid solution cast multilayer membranes will be sufficient to ensure long-term fuel cell performance.

In general summary, the multilayer PEM of the present invention provides efficient in-situ capture of product water at the cathode during fuel cell operation, accelerated back-diffusion of water to the anode due to the intermittent zirconium sulphophenyl phosphonate layers, a reduction in gas crossover and an improvement in membrane mechanical properties. The fabrication of a stratified, multilayer solution cast, resolubilized perfluorosulfonic acid (such as resolubilized NAFION®) membrane comprising compact continuous layers of pure resolubilized perfluorosulfonic acid (such as NAFION®) and NAFION®/zirconium sulphophenyl phosphonate, where the hydrophilic inorganic particles are concentrated in discreet layers, forms an aspect of the present invention.

A primary feature of the present invention is an optimized, multilayer distribution of hydrophilic nano-sized zirconium sulphophenyl phosphonate particles in resolubilized perfluorosulfonic acid for allowing the continuous hydration of a PEM during fuel cell operation by recapturing and more effectively transporting water generated at the fuel cell cathode. In turn, this system will improve fuel cell operation at conditions of high temperature and low relative humidity. Additionally, the present invention provides an overall zirconium sulphophenyl phosphonate doping level in a solution cast multilayer design which is significantly lower than what is required in a homogenously dispersed system to minimize, or even eliminate, any loss in the mechanical strength of the final membrane. Another feature of the present invention is that the presence of nano-sized zirconium sulphophenyl phosphonate particles in compact, thin layers increases the tensile strength of the membrane when combined with the multi-layer structure of the membrane.

It is an object of the present invention to provide improved dimensional stability and a solution cast polymer electrolyte membrane that is elastic with improved crease and crack resistance.

It is another object of the present invention to provide methods for producing solution cast multilayered polymer electrolyte membranes for use with fuel cells.

It is yet another object of the present invention to provide novel composite polymer and ion conducting specialty materials for use with multilayered polymer electrolyte membranes.

It is still yet another object of the present invention to provide a solution cast composite multilayered membrane for use in a hydrogen or methanol fuel cell.

It is another object of the present invention to provide an improved solution cast solid polymer electrolyte multilayered membrane having high ionic conductivity, significantly improved resistance to dehydration, increased overall mechanical strength, improved chemical stability, significantly improved gas permeability, significantly reduced gas crossover and better stability at elevated operating temperatures.

It is an object of the present invention to provide a combination of membrane self-humidification, hybrid multi-layering and a polymer solution casting process capable of depositing multiple micron-thick polymer layers (with or without an additive(s)).

It is another object of the present invention to provide solution cast multilayer resolubilized perfluorosulfonic acid (such as NAFION®)-zirconium sulphophenyl phosphonate membranes for use in lower humidity hydrogen/air fuel cells.

It is yet another object of the present invention to provide high performance ultra thin solution cast PEM multilayer membranes made from recast resolubilized perfluorosulfonic acid having improved anode hydration by back diffusion of water, proton conductance, gas barrier properties and mechanical strength.

It is another object of the present invention to provide solution cast multilayer membranes having a reduction in the required amount of a PEM polymer.

It is yet another object of the present invention to provide solution cast multilayer membranes having reduced production costs.

It is still yet another object of the present invention to provide solution cast multilayer membranes for providing more efficient and more cost-efficient fuel cells.

Other objects of the present invention will become apparent from the description to follow and from the appended claims.

BRIEF DESCRIPTION OF THE DRAWINGS

FIG. 2 is a schematic diagram of a solution cast multilayer structure having gradient interlayer spacing, in accordance with the present invention.

FIG. 3 is a schematic diagram of a solution cast multilayer structure having uniform interlayer spacing, in accordance with the present invention.

DETAILED DESCRIPTION OF THE PREFERRED EMBODIMENTS

Figure 1:
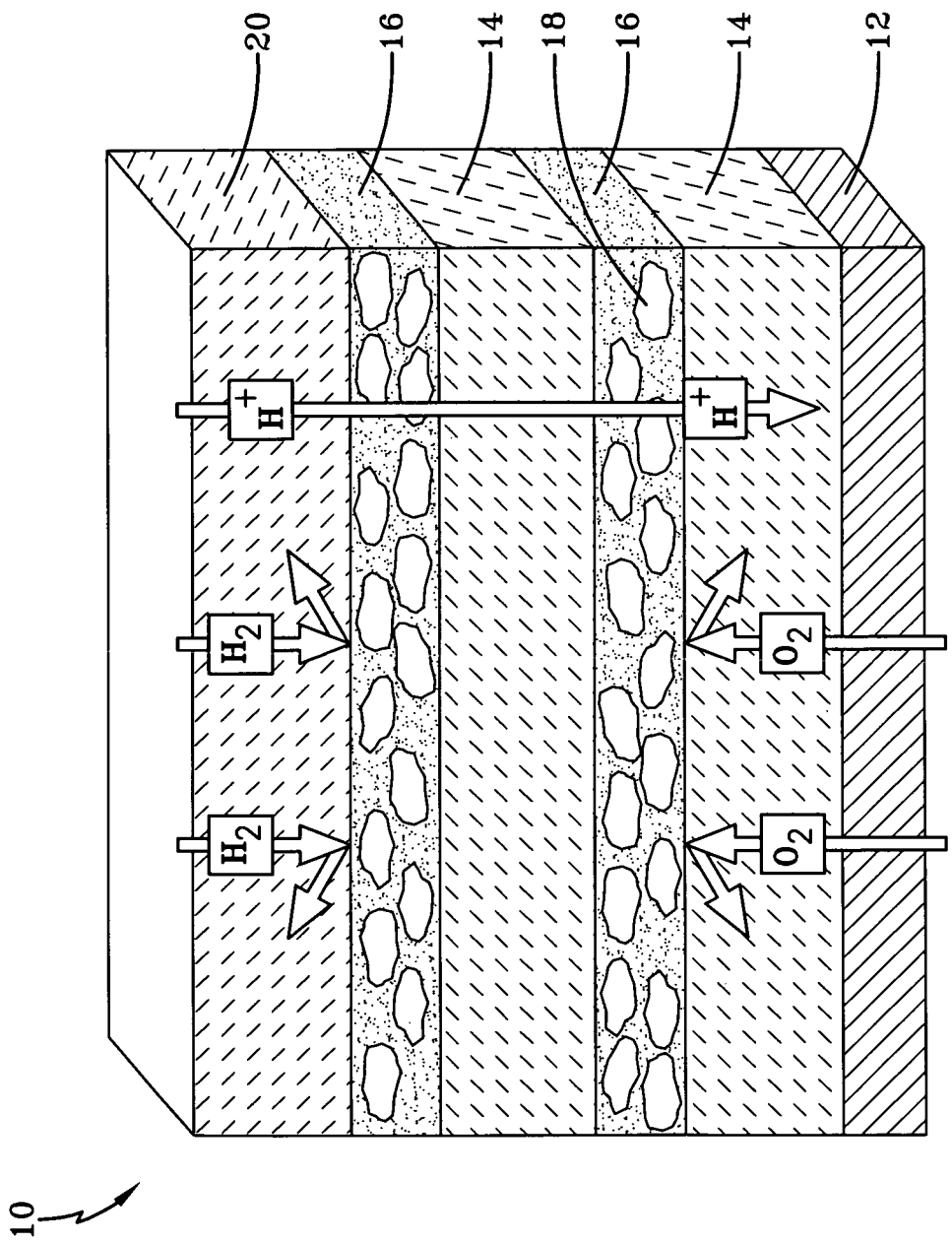
FIG. 1 is a schematic cross-section of a solution cast multilayer membrane in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details.

Turning now to FIG. 1, a schematic cross-section of a solution cast multilayer membrane in accordance with the present invention is shown and referred to generally at numeral 10. Solution cast multilayer membrane 10 comprises a temporary flexible carrier film, sheet or substrate 12 for supporting solution cast multilayer membrane 10 during solution casting/processing in roll-to-roll foam. The temporary, flexible carrier sheet serves no functional purpose in the completed solution cast multilayer membrane. It is a processing aid during the solution casting process. The temporary, flexible carrier sheet is removed after the solution casting process and is therefore not an integral part of the completed solution cast in-situ multilayer membrane. Temporary, flexible carrier film, sheet or substrate 12 may be a polyethylene terephthalate (PET) type layer, or similar type of polyester material, such as biaxially-oriented polyethylene terephthalate, including those sold under the trade names MYLAR® or MELINEX®. Other materials which may be employed for temporary carrier film, sheet or substrate 12 may be, but in no way limited to, aluminum foil, particularly aluminum foil having a thickness in the range of 25-100 microns, polyester coated papers including polyethylene coated papers, casting papers comprising a specialty high temperature coating (excluding polyester including polyethylene), casting papers having high release silicones, and aluminum foil laminates with stable paper substrates.

Solution cast multilayer membrane 10 further comprises at least one layer of an unfilled conductive polymer electrolyte material 14. Unfilled electrolyte material layer 14 may be a crystalline material known in the art, including, but not limited to resolubilized perfluorosulfonic acid (PFSA) known under the trade name of NAFION®. Unfilled electrolyte material layer 14 should preferably have a dry thickness of about between 5-20 microns and may be applied to temporary carrier film 12 via conventional methods known in the art, such as, but not limited to, solution casting methods including gravure coating, knife over roll, reverse roll, slot die, micro gravure, and curtain coating methods.

Still referring to FIG. 1, solution cast multilayer membrane 10 further comprises at least one layer of a conductive polymer electrolyte material 16 which is doped with a plurality of nanoparticles 18. Doped electrolyte material layer 16 may be a crystalline material known in the art, including, but not limited to resolubilized perfluorosulfonic acid (PFSA) known under the trade name of NAFION®. Doped electrolyte material layer 16 should preferably have a dry thickness of about between 5-20 microns and may be applied to electrolyte material 14 via conventional methods known in the art, such as, but not limited to, solution casting methods including gravure, knife over roll, reverse roll, slot die, micro gravure, and curtain coating methods.

Nanoparticles 18 are hydrophilic filler nanoparticles, such as, but not limited to, zirconium phosphonate and a cage-like hybrid intermediate compound (polyhedral oligomeric silsesquioxane). In a preferred embodiment, nanoparticles 18 comprise a distribution of hydrophilic nano-sized zirconium phosphonate particles, namely, hydrophilic nano-sized zirconium sulphophenyl phosphonate particles. In a preferred embodiment, the concentration of the filler nanoparticles 18 are in a range from 0.1% of filler based on the dry weight of conductive polymer electrolyte material 16 to 50% of the dry weight of conductive polymer electrolyte material 16.

With continued reference to FIG. 1, solution cast multilayer membrane 10 further comprises a final layer of an unfilled conductive polymer electrolyte material 20. Final electrolyte material layer 20 may be a crystalline material known in the art, including, but not limited to resolubilized perfluorosulfonic acid (PFSA) known under the trade name of NAFION®. Final electrolyte material layer 20 should preferably have a thickness of about between 5-20 microns and may be applied to the top layer of at the least one layer of doped conductive polymer electrolyte material 16 via conventional methods known in the art, such as, but not limited to, solution casting methods including gravure, knife over roll, reverse roll, slot die, micro gravure, and curtain coating methods. In an exemplary embodiment, electrolyte material layer 20 comprises the same material as that of conductive polymer electrolyte material 14.

As shown in FIG. 1, solution cast multilayer membrane 10 comprises a total of 6 layers, including temporary carrier film 12, two layers of unfilled conductive polymer electrolyte material 14 and two layers of conductive polymer electrolyte material 16 doped with nanoparticles 18, and a final layer of an unfilled conductive polymer electrolyte material 20. However, it should be appreciated that top layer 20 may alternatively comprise at least one additional polymer material as appropriate with the particular application at hand. As shown in FIG. 1, layers 14 and 16 are provided in an alternating arrangement. However, it should be appreciated that the present invention should not be limited to the arrangement as set forth in FIG. 1 but rather may include any number of sets of alternating layers comprising a layer of unfilled conductive polymer electrolyte material 14 and a layer of a doped conductive polymer electrolyte material 16 as will be discussed further below. In a preferred embodiment, solution cast multilayer membrane 10 comprises between 3-9 layers having a total thickness of between 10-75 microns, with a final layer of conductive polymer electrolyte material 20 being the top layer. Also in a preferred embodiment, the caliper of the individual layers may range from 1.0 dry micron to 50 dry microns. It should be appreciated that solution cast multilayer membrane 10 is not limited to the arrangement as set forth in FIG. 1, but may include at least two adjacent layers of doped conductive polymer electrolyte material 16 or any combination of alternating layers 14, 16 with at least two adjacent doped layers.

Figure 1A:
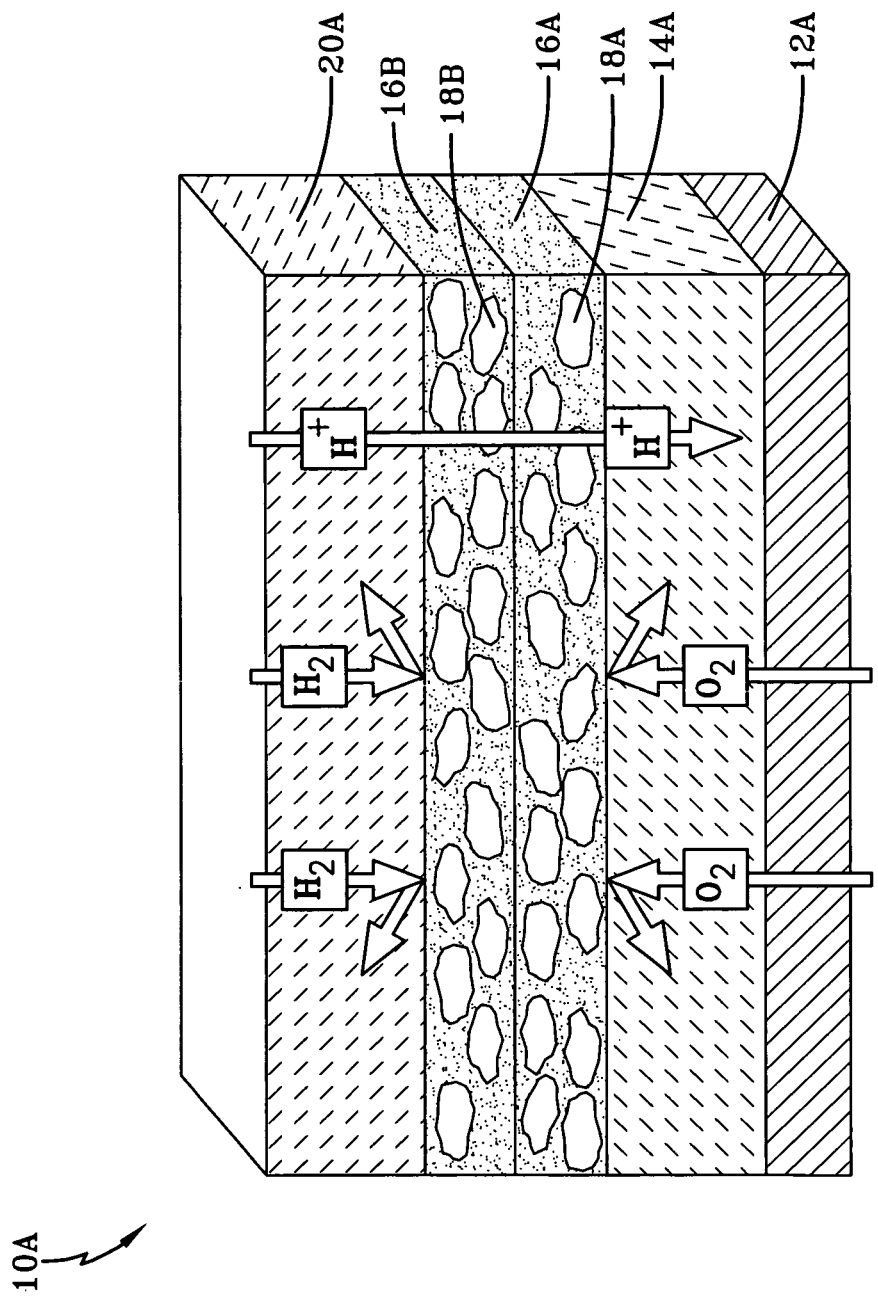
FIG. 1a is a schematic cross-section of an alternative embodiment of the solution cast multilayer membrane in accordance with the present invention, as shown in FIG. 1.

Referring now to FIG. 1A, an alternative embodiment of the solution cast multilayer membrane of FIG. 1 is shown and referred to generally at 10A. Solution cast multilayer membrane 10A comprises a total of 5 layers as depicted in FIG. 1A; however, the illustrated embodiment is not limited to a five-layer arrangement. Solution cast multilayer membrane 10A comprises temporary carrier film or substrate 12A, a layer of an unfilled conductive polymer electrolyte material 14A, a first layer of a doped conductive polymer electrolyte material 16A doped with a plurality of nanoparticles 18A, a second layer of a doped conductive polymer electrolyte material 16B doped with a plurality of nanoparticles 18B which is adjacent to the first layer of a doped conductive polymer electrolyte material 16A and a final top layer of an unfilled conductive polymer electrolyte material 20A. As shown in FIG. 1A, layers 16A and 16B are provided in an adjacent arrangement. In a preferred embodiment, solution cast multilayer membrane 10A comprises between 3-9 layers having a total thickness of between 10-75 microns, with a final layer of conductive polymer electrolyte material 20A being the top layer. Also in a preferred embodiment, the caliper of the individual layers may range from 1.0 dry micron to 50 dry microns.

Referring now to FIG. 2, one embodiment of the present invention is shown by way of a schematic diagram of a solution cast multilayer structure having gradient interlayer spacing in accordance with the present invention. As shown in FIG. 2, this embodiment of the solution cast multilayer membrane in accordance with the present invention is shown and generally referred to at numeral 100. Solution cast multilayer membrane 100 comprises layers of unfilled conductive polymer electrolyte material 114 and layers of conductive polymer electrolyte material 116 having various thicknesses in order to form solution cast multilayer membrane 100 having a gradient interlayer spacing arrangement. It should be appreciated that conductive polymer electrolyte material 116 comprises a plurality of nanoparticles 118 doped therein, as described above with reference to FIG. 1, such as, for example, hydrophilic zirconium phosphonate nanoparticles. As shown in FIG. 2, nanoparticles 118 are provided at uniform density in each subsequent layer of conductive polymer electrolyte material 116. However, in an alternative embodiment, nanoparticles 118 may be provided at varying concentrations within each subsequent layer of conductive polymer electrolyte material 116.

Referring now to FIG. 3, a second embodiment of the present invention is shown by way of a schematic diagram of a multilayer structure having uniform interlayer spacing in accordance with the present invention. As shown in FIG. 3, this embodiment of the solution cast multilayer membrane in accordance with the present invention is shown and generally referred to at numeral 200. Solution cast multilayer membrane 200 comprises layers of unfilled conductive polymer electrolyte material 214 and layers of conductive polymer electrolyte material 216 having a uniform thickness in order to form multilayer membrane 200 having a uniform interlayer spacing arrangement. It should be appreciated that conductive polymer electrolyte material 216 comprises a plurality of nanoparticles 218 doped therein, as described above with reference to FIG. 1, such as, for example, hydrophilic zirconium sulphophenyl phosphonate nanoparticles. As shown in FIG. 3, nanoparticles 218 are provided at uniform density in each subsequent layer of conductive polymer electrolyte material 216. However, in an alternative embodiment, nanoparticles 218 may be provided at varying concentrations within each subsequent layer of conductive polymer electrolyte material 216.

Figure 4:
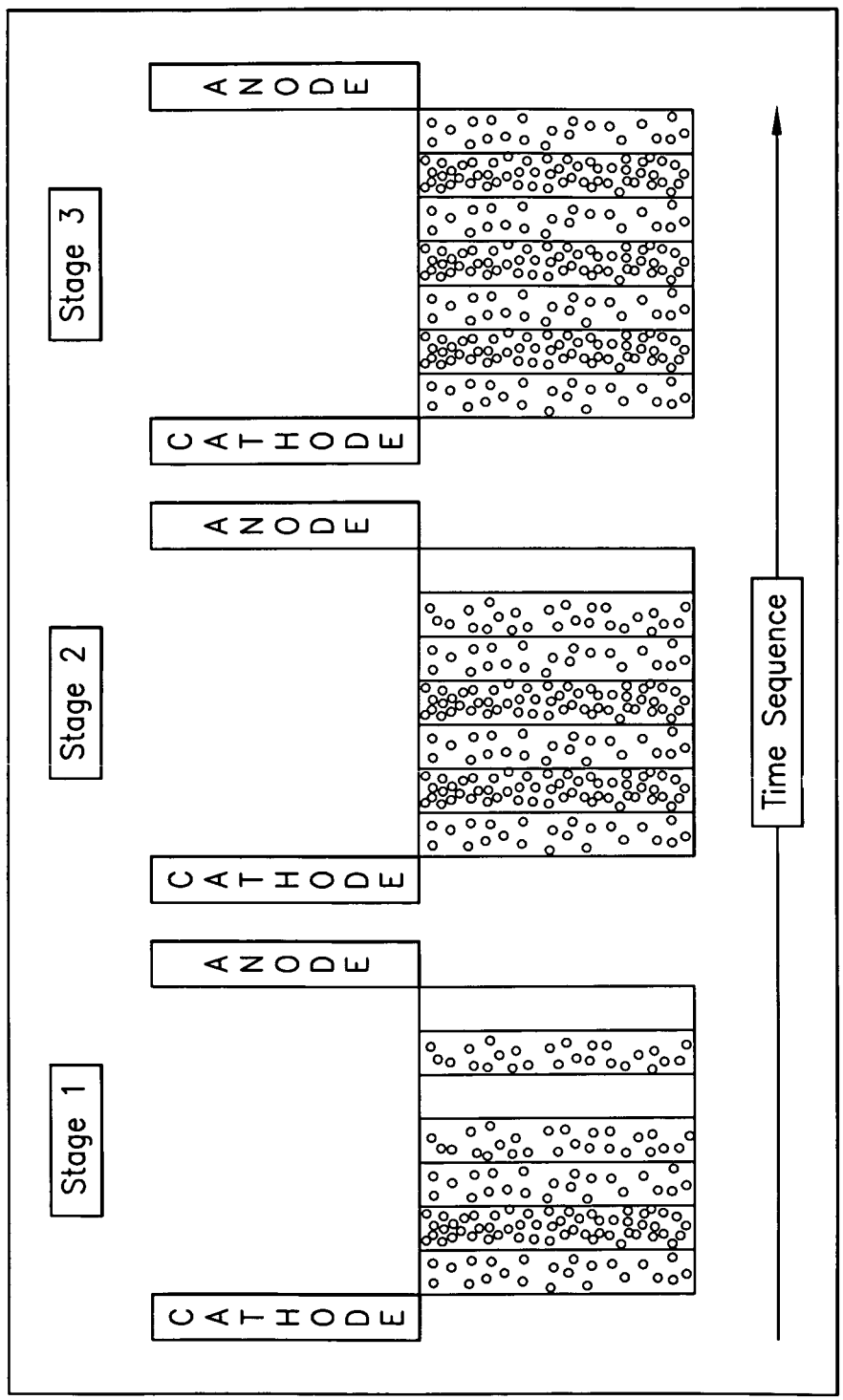
FIG. 4 is a schematic diagram of a cathode-to-anode hydration process in accordance with the present invention.

Turning now to FIG. 4, a schematic diagram of three stages of a cathode-to-anode hydration process in accordance with the present invention is shown. As shown in FIG. 4, the transport of water from the cathode end of a conventional fuel cell towards the anode end of a conventional fuel cell is facilitated by the present invention. FIG. 4 shows the migration of water from the cathode to the anode. The hydrophilic particles enhance the migration and hold the water in the respective layers, rather than causing unwanted flooding of the anode.

The method of forming the solid polymer ion exchange solution cast multilayer membrane of the present invention for use with conventional fuel cell applications will now be described. Essentially, the method of preparing the solution cast multilayer membrane of the present invention involves the solution casting and/or coating (or a similar method known in the art) of conductive polymers and the solution casting and/or coating of doped, conductive polymers in alternating layers or a plurality of doped layers adjacent to each other. In this formation, filler particles are doped within the filled, conductive polymer layer(s) and may be in any physical form. However, the particles are preferably in the form of fine nano-sized particles. In the case where two or more doped conductive polymer layers are employed, the adjacent layers may comprise nanoparticles in uniform density or in varying densities.

The method of the preferred embodiments of the present invention comprises first selecting a temporary carrier film for supporting the solution cast multilayer membrane during processing. The temporary carrier film may be a pre-formed carrier film or substrate. The temporary carrier film may be of any type generally known in the art, such as a polyethylene terephthalate (PET) type layer, or similar type of polyester material, including those sold under the trade names MYLAR® or MELINEX®. Other materials which may be employed for temporary carrier film, sheet or substrate 12 may be, but in no way limited to, aluminum foil, particularly glass or aluminum foil having a thickness in the range of 25-100 microns, polyester coated papers including polyethylene coated papers, casting papers comprising a specialty high temperature coating (excluding polyester including polyethylene), casting papers having high release silicones, and aluminum foil laminates with stable paper substrates.

A first application of a solution of an unfilled conductive polymer electrolyte material is applied to the temporary carrier film by a solution casting process which is conventional in the art, such as by any one of those set forth above. The soluble electrolyte material may be a crystalline material, a semi-crystalline material or an amorphous material known in the art, including, but not limited to resolubilized perfluorosulfonic acid (PFSA). Applicable solvents for use with the method of the present invention are, but in no way limited to, water, alcohols, aromatics, acetates, N,N-Dimethylacetamide (DMAC), (including acetic acid, dimethylamide; dimethyl acetamide; acetyldimethylamine), tetrahydrofuran (THF) or a diethyl ether, N-methyl-2-pyrrolidone (NMP), methylene chloride, ketones, and dimethyl sulfoxide (DMSO), or combinations of the aforementioned solvents. In particular, the method of the present invention may comprise a solution casting method of the polymers where the solvents are mixtures of true solvents and/or mixtures of true solvents and diluents, such as low molecular weight alcohols, aromatics and acetates. The solution of an unfilled conductive polymer electrolyte material is cast onto the temporary carrier film, such as a PET web, and subsequently dried by way of a conventional drying method known in the art, such as by a convection oven, to obtain a dry thickness of between 5-20 microns.

The method of the present invention further includes applying by solution casting a layer of a solution of a conductive polymer electrolyte material and nanoparticles to the dried unfilled conductive polymer electrolyte material layer by a casting process conventional in the art, such as by any one of those set forth above. The soluble electrolyte material may be a crystalline material, a semi-crystalline material or an amorphous material known in the art, including, but not limited to resolubilized perfluorosulfonic acid (PFSA). Applicable solvents for use with the method of the present invention are, but in no way limited to, water, alcohols, aromatics, acetates, N,N-Dimethylacetamide (DMAC), (including acetic acid, dimethylamide; dimethyl acetamide; acetyldimethylamine), tetrahydrofuran (THF) or a diethyl either, N-methylpyrrolidone (NMP), methylene chloride, ketones, and dimethyl sulfoxide (DMSO), or combinations of the aforementioned solvents. In particular, the method of the present invention comprises a solution casting method of the polymers where the solvents are mixtures of true solvents and/or mixtures of true solvents and diluents, such as low molecular weight alcohols, aromatics and acetates. The solution of a conductive polymer electrolyte material and nanoparticles is applied to the dried layer of an unfilled conductive polymer electrolyte material and subsequently dried by way of a conventional drying method known in the art, such as a convection oven to obtain a dry thickness of between 5-20 microns.

The filler material nanoparticles for doping the relevant layers of the present invention are preferably hydrophilic filler zirconium-type nanoparticles, and a cage-like hybrid intermediate compound (polyhedral oligomeric silsesquioxane). Preferably, the nanoparticles comprise a distribution of hydrophilic nano-sized zirconium phosphonate particles. The concentration of the filler nanoparticles within the solution of the conductive polymer electrolyte material are in a range from 0.1% of filler based on the dry weight of conductive polymer electrolyte material to 100% of the dry weight of conductive polymer electrolyte material, or even no more than about 50%.

A second layer of a solution of an unfilled conductive polymer electrolyte material may be applied to a dried layer of a conductive polymer electrolyte material and nanoparticles (a first doped layer) by a casting process conventional in the art, such as by any one of those set forth above. As noted above, the soluble electrolyte material may be a crystalline material, a semi-crystalline material or an amorphous material known in the art, including, but not limited to NAFION® and applicable solvents may be any one or a combination of water, alcohols, aromatics, acetates, N,N-Dimethylacetamide (DMAC), (including acetic acid, dimethylamide; dimethyl acetamide; acetyldimethylamine), tetrahydrofuran (THF) or a diethyl ether, N-methylpyrrolidone (NMP), methylene chloride, ketones, and dimethyl sulfoxide (DMSO). This additional layer of an unfilled conductive polymer electrolyte material is applied via a solution casting process and subsequently dried to obtain a dry thickness of between 5-20 microns.

The method may further comprise applying a second layer a solution of a conductive polymer electrolyte material and nanoparticles to the dried second layer of unfilled conductive polymer electrolyte material layer by a solution casting process as discussed above. The soluble electrolyte material may be a crystalline material, a semi-crystalline material or an amorphous material known in the art, including, but not limited to NAFION® and applicable solvents may be any one of or a combination of water, alcohols, aromatics, acetates, N,N-Dimethylacetamide (DMAC), (including acetic acid, dimethylamide; dimethyl acetamide; acetyldimethylamine), tetrahydrofuran (THF) or a diethyl either, N-methylpyrrolidone (NMP), methylene chloride, ketones, and dimethyl sulfoxide (DMSO). This additional layer of a conductive polymer electrolyte material and nanoparticles is solution cast onto the dried second layer of an unfilled conductive polymer electrolyte material and subsequently allowed to dry accordingly to obtain a dry thickness of between 5-20 microns.

The filler material nanoparticles in the second layer are preferably hydrophilic filler zirconium-type nanoparticles, such as, but not limited to, zirconium phosphonate and a cage-like hybrid intermediate compound (polyhedral oligomeric silsesquioxane) and preferably are the same type of nanoparticles as employed in connection with the first layer of conductive polymer electrolyte material and nanoparticles.

In accordance with the method of the present invention, the application of alternating layers of solutions of an unfilled conductive polymer electrolyte material and a doped conductive polymer electrolyte material and nanoparticles via a solution casting process continues as desired in an alternating fashion with each applied layer allowed to dry accordingly. However, it should be appreciated that the method of the present invention may alternatively include the application of at least two adjacent layers of doped conductive polymer electrolyte material, as described above with reference to FIG. 1A. In one embodiment of the present invention, the solution cast multilayer membrane final product comprises a total of 3-9 layers, including the optional final layer, discussed below, to achieve a total membrane thickness as desired. In a preferred embodiment, the total final membrane thickness should be between 10-75 microns, and more particularly, between 25-50 microns, and the solid materials in the solution cast multilayer membrane comprise 3% to 30% resolubilized perfluorosulfonic acid (PFSA) polymer on a dry weight of the total solution.

A top solution of an unfilled conductive polymer electrolyte material is solution cast onto the top layer of a conductive polymer electrolyte material and nanoparticles. The final top electrolyte material layer may be a crystalline material, a semi-crystalline material or an amorphous material known in the art, including, but not limited to NAFION®, or other types of tetrafluoroethylene copolymers. The final top electrolyte material layer should preferably have a dry thickness of about between 5-20 microns and may be applied to the top layer of a conductive polymer electrolyte material and nanoparticles via conventional methods known in the art, as discussed above and allowed to dry accordingly.

The method of the present invention further comprises an annealing step, the annealing step being known to those skilled in the art and therefore a detailed description of annealing is omitted for the sake of brevity. Annealing is performed once every layer of the solution cast multilayer membrane has been applied to create improved film integrity, such as tensile strength, improved modulus of elasticity and improved elongation. However, annealing is only performed when the applied layers comprise a crystalline material or a semi-crystalline material. Alternatively, conventional drying is employed when the applied layers comprise an amorphous material, such as air-drying or the use of a convection oven. In addition, conventional chemical or physical treatments which are known in the art may be employed for improving film integrity, such as tensile strength, improving modulus of elasticity and improving elongation.

The layering process in accordance with the present invention may comprise employment of any one of known techniques, such as casting techniques for applying materials to a temporary carrier, as discussed in detail above. The proton exchange membrane of the present invention can be produced by solution casting techniques including knife over roll, gravure, direct, offset, micro gravure, reverse roll and curtain coating methods.

In a one embodiment, the method of the present invention comprises employment of knife over roll method and the gravure process for forming the solution cast multilayered membrane. A temporary carrier film is provided and a first application of a solution of unfiled polymer soluble in a solvent such as water, alcohol(s), NMP or DMAC or combinations is coated onto the PET web at a dry thickness of 5 to 20 microns. The material is dried using convection ovens that are part of the coater. The PET carrier film that has been coated with a conductive polymer is then returned to the coating station and a second coating comprising a conductive polymer and nanoparticles is applied at a dry coating thickness of 5 to 20 microns. This alternating of layers can continue based on the desired overall thickness desired.

In one embodiment, layering can be uniform, i.e., each unfilled and filled layers can comprise the same composition and the solution cast multilayer membrane may comprise a 3-9 layer membrane where the first and last layers comprise unfilled, conductive polymers. In addition, in one embodiment, membranes from the anode to the cathode side are substantially uniformly spaced.

In further embodiments, various compositions of unfilled and filled layers may be employed in the solution cast multilayer membrane of the present invention, layering of the unfilled and filled layers may vary in the respective dry thickness and layering of the unfilled and filled layers may be non-uniform. Still further, the present invention envisions putting more doped layers on either the anode or cathode side. For example, it is possible to have uniform layers on the anode side and then increase the number of layers toward the cathode side and even produce various calipers of thickness toward the cathode side to enhance water management (or vice versa). Still further, it is within the scope of the present invention to provide at least two doped layers adjacent to each other rather than providing doped and unfilled layers in an alternating manner

EXAMPLES

Enhancements Resulting from Layering

Tensile Strength: Laboratory tests on single layered NAFION® dry films indicate that increases in the concentration of hydrophilic nanoparticles decreases the tensile strength of the NAFION® films. However, multiple layers of nano-filled NAFION® membranes showed comparable tensile strength of the NAFION® films at increasing concentrations of nanoparticles.

TABLE 1

| | Tensile strength in N/mm$^2$ | |
|---|---|---|
| | 1 layer dry Tensile strength | 2 layers dry Tensile strength |
| Undoped NAFION ® | 24 | 22 |
| 2.0% ZrSPP | 22 | 20 |
| 5.0% ZrSPP | 17 | 23 |
| 10.0% ZrSPP | 20 | 23 |

Tensile Strength: Table 2 indicates that layered films containing a middle layer of hydrophilic nanoparticles in NAFION® showed comparable or a very slight increase in tensile strength.

TABLE 2

| | N/mm2 |
|---|---|
| NAFION ®-lab cast (2 layers) | 20.2 |
| NAFION ®/ZrSPP/NAFION ® (3 layers) | 20.3 |
| NAFION ®/zr//NAFION ®/zr/NAFION ® (5 layers) | 21.3 |

Elastic Modulus: EM or Young's modulus describes tensile elasticity, or the tendency of an object to deform along an axis when opposing forces are applied along that axis. It is defined as the ratio of tensile stress to tensile strain. Another data point showing increased strength is provided below at Table 3.

TABLE 3

| | Elastic Modulus/N/mm2 |
|---|---|
| NAFION®-2 layers, undoped | 156 |
| 10% ZRSPP(2 layers) | 233 |

Polymer conductivity and tensile strength (combinatorial approach of a polymer with various degrees of conductivity). The present results show that a polymer can be made conductive by sulfonation. The degree of sulfonation is critical to the conductivity and the tensile strength. The higher the degree of sulfonation, the higher the conductivity but the lower the tensile strength. Layering in a membrane allows for the blending of degrees of sulfonated polymer in layers to obtain a desirable degree of conductivity and also higher tensile strength.

Nanoparticles, conductivity, tensile strength and water management: The combination of effects i.e. improved conductivity at low relative humidity, increased strength (e.g., tensile and modulus) and water management can be managed by the addition of hydrophilic nanoparticles and by layering. The present invention of alternating unfilled and doped layers obtains the desired objective. In accordance with the present invention, the stated objectives are obtained by providing suitable nanoparticles which are compatible with the particular conductive polymers.

The Addition of a Nanoparticle to NAFION® and the Improvement in Performance of a Multilayer NAFION® Proton Exchange Membrane.

The data of Table 4 (below) sets forth data showing significant improvement in in-plane conductivity at low humidity and 100° C. temperatures for a highly filled NAFION® polymer with Zirconium sulphophenyl phosphonate nanoparticles. In particular, the data shows the effect of adding a nanoparticle to NAFION® and the effect of the nanoparticle on conductivity and stability of the filled layer. The normal loading of nanoparticle concentrations found in the prior art literature indicates 3-10% to be sufficient to increase conductivity. However, in accordance with the present invention, studies show that the 3-10% level does little to enhance the conductivity of the system. Low concentrations of nanoparticles in single layer membranes do not improve the conductivity of NAFION® at room temperature and do not help at higher temperatures and low 25% relative humidity. Significantly higher levels of nanoparticle concentrations have been tested. Table 4 below shows that 30% levels of nanoparticle concentrations resulted in higher conductivities at room temperature. However, the 30% nanoparticle loading in a single layer membrane creates a very brittle and unusable membrane.

TABLE 4

Various ZrSPP* nanoparticle concentrations in NAFION® Single layers

| Casting additives | Conductivity (mS/cm) RT. Water |
|---|---|
| none | 89 |
| 10% ZrSPP | 69 |
| 20% ZrSPP | 60 |
| 30% ZrSPP[1] | 117 |

Figure 5:
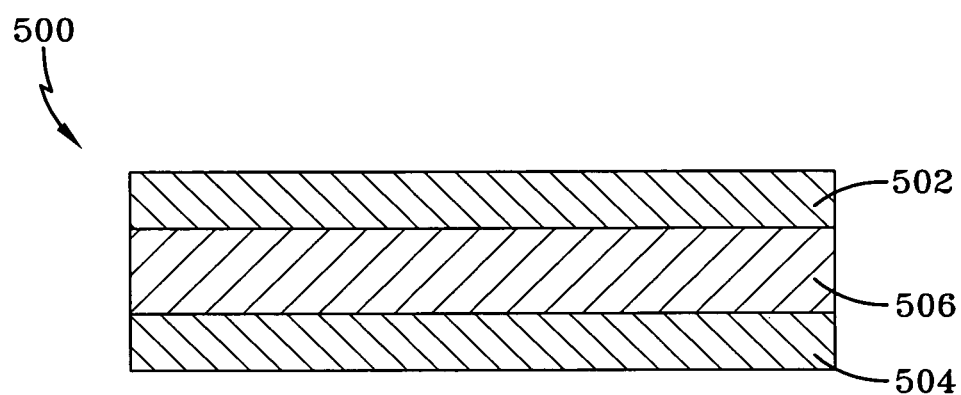
FIG. 5 is a schematic cross-section of a solution cast multilayer membrane in accordance with yet another additional embodiment of the present invention.

*ZrSPP is Zirconium sulfophenyl phosphate
[1]Membrane is very brittle and has pinholes Referring now to FIG. 5, a three-layer membrane using unfilled NAFION® on the outer layers and a filled NAFION® in the middle layer is shown and provided at numeral 500. This particular embodiment of the present invention was created as a result of the testing data as provided in Table 4. The multiple layers are provided in this embodiment of the present invention to encapsulate the filled NAFION® layer and enhance flexibility of the membrane. A solution cast multilayer membrane is provided and referred to generally at numeral 500. A further discussion of the embodiment shown in FIG. 5 will be provided below.

An alternative embodiment of the present invention will now be described, whereby the general features and structure of the first embodiment are fully incorporated herein by reference. However, in this embodiment, polyphenylsulfone (e.g., RADEL®) is employed in place of resolubilized perfluorosulfonic acid (PFSA) and POSS nanoparticles (e.g., phosphonated polyhedral oligomeric silesesquioxane) are employed as the plurality of nanoparticles.

Referring now to Table 5 (below) and FIG. 6, the results of in-plane conductivity of single layers versus multilayered membranes produced from sulfonated RADEL® R 5000 (i.e., polyphenylsulfone) as the conductive polymer are shown. POSS nanoparticles in this instance are sulfonated polyhedral oligomeric silsesquioxane. The data shows increased in-plane conductivity for multilayered fuel cell membranes that contain both a conductive polymer and a nanoparticle that is hydrophilic and conductive. Table 5 demonstrates the increased in-plane conductivity of the multilayered membrane versus the in-plane conductivity of the single layers with and without nanoparticles. The data also shows the drop in tensile strength as nanoparticles are added in single layers, but less of a drop in tensile strength with the multilayered arrangement. The tensile strength of the multilayered membrane shows a decrease of 11.3%, whereas the filled single layers show 20.4% and 15.9%, respectively.

Figure 6:
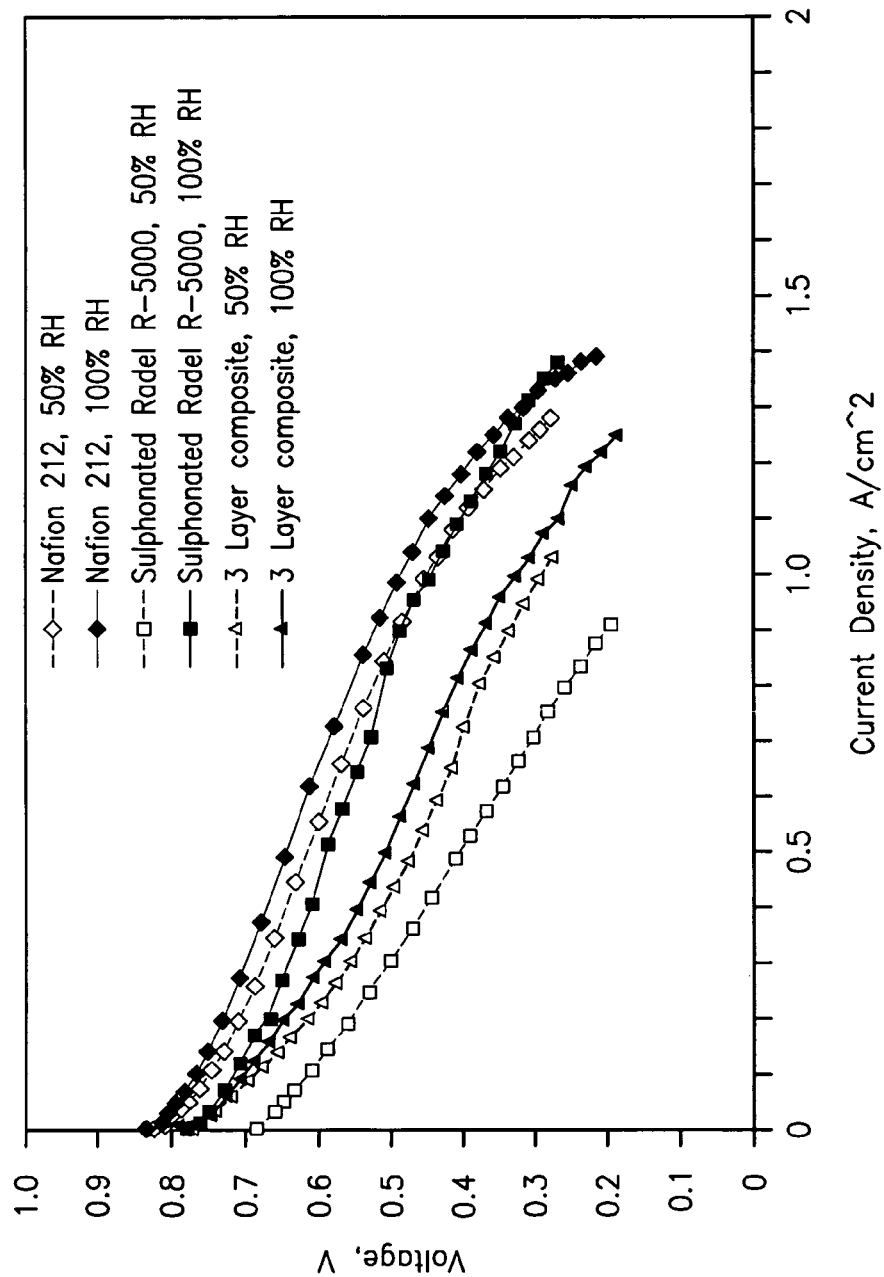
FIG. 6 is a graph showing the relative current density of one embodiment of the present invention relative to the voltage in the embodiment of the present invention.

FIG. 6 specifically sets forth a Polarization Curve of 1) NAFION®, 2) a single layer of Sulfonated RADEL® R 5000 and 3) a solution cast multilayer membrane of Sulfonated RADEL® R 5000 using POSS nanoparticles. The data demonstrates that the differential drop in current density (from 100% humidity to 50% humidity) of the three layer membrane is much less than for the single layer membrane.

TABLE 5

IN PLANE CONDUCTIVITY, S/cm/Tensile, N/mm$^2$

| | Room temperature | 80° C. | RT/50% Rh |
|---|---|---|---|
| Single layered membranes | | | |
| Sulfonated RADEL ®R 5000 | 0.081 | 0.131 | 44 |
| S- RADEL ®R 5000 + 10% POSS | 0.078 | 0.128 | 35 |
| S- RADEL ®R 5000 + 20% POSS | 0.061 | 0.103 | 37 |
| Multilayered membrane | | | |
| 5 layered membrane | 0.086 | 0.143 | 39 |

The single layer solution cast membranes are provided at 50 microns dry caliper, with and without POSS nanoparticles at 10 & 20% of dry weight of polymer. The multilayer solution cast membrane is provided with unfilled outer layers of S-RADEL® R only, and filled intermediate layers of POSS at 10% and a center layer of POSS at 20% (% POSS based on dry weight of polymer).

Figure 7:
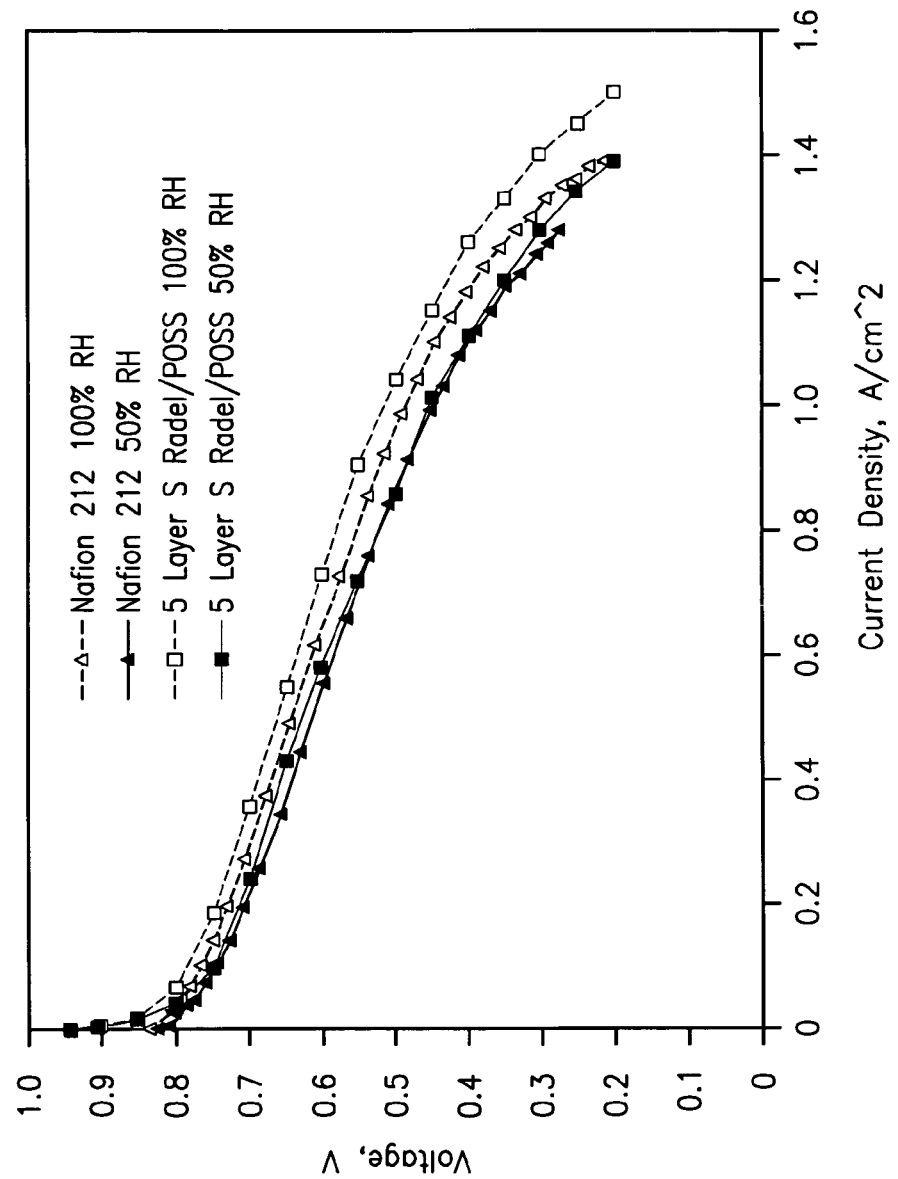
FIG. 7 is a graph showing the relative current density of one embodiment of the present invention relative to the voltage in the embodiment of the present invention.

The data of Table 5 reflect an increase of the number of layers from three to five in accordance with the present invention. FIG. 7 shows a polarization curve where the five layer arrangement is better than the arrangement employing a NAFION®-layered arrangement (as compared to the three layer performance described above). The data shows that the present invention provides improved conductivity as the layers are increased and as a gradient is provided, which is expected to achieve improved fuel cell performance.

Figure 8:
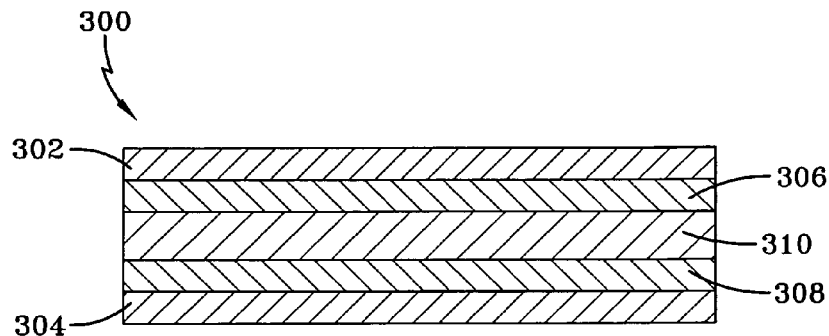
FIG. 8 is a schematic cross-section of a solution cast multilayer membrane in accordance with an additional embodiment of the present invention.

As shown in FIG. 8, a five-layer membrane in accordance with an embodiment of the present invention and in accordance with the data of FIG. 7 is shown generally at numeral 300. Five-layer membrane 300 comprises unfilled outer layers 302 and 304, layers 306 and 308 which are 10% filled/doped with sulfonated POSS and a center layer 310 comprising 20% sulfonated POSS. Each of layers 302, 304, 306 and 308 comprise a dry caliper of 8 microns, while center layer 310 comprises a dry caliper of 18 microns.

It should be appreciated that the differential in the voltage versus current density curves in the 3 layer composite at 100% and 50% humidity is significantly less than the single layer sulfonated RADEL® R 5000 at 100% and 50% humidity.

The Storage Modulus of Multilayer Systems Using Dynamic Mechanical Analysis (DMA)

The information on the Dynamic Mechanical Analysis (DMA) (Table 6, below) shows the effect of multilayers on the overall strength of the membrane across the temperature range required for high temperature fuel cells. The DMA data for the NAFION® membrane clearly shows why NAFION® is only used in fuel cells at temperatures up to 80° C. The prior art shows that the addition of fillers, in particular nano- or micron-sized fillers, consistently lower the strength of the polymer. The encapsulation of the middle layer demonstrates the high strength of the storage modulus across the temperature range and the minimal effect of the filler.

Figure 9:
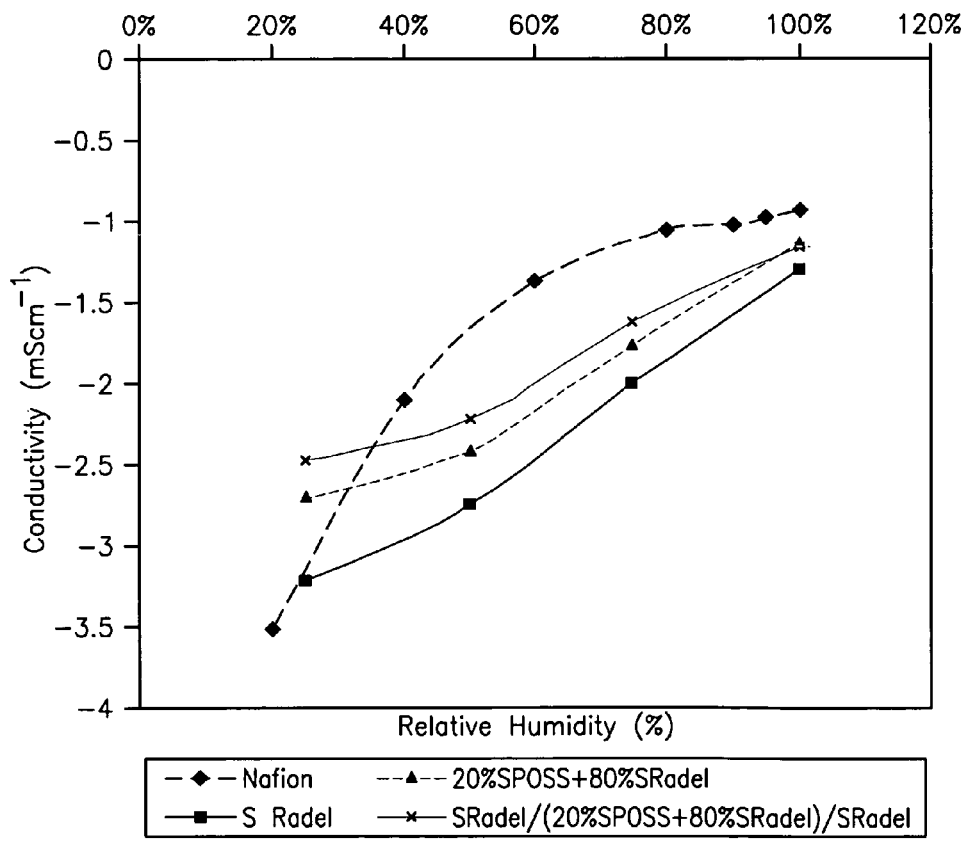
FIG. 9 is a graph showing the relative humidity of one embodiment of the present invention relative to the conductivity in the embodiment of the present invention.

Referring now to FIG. 9, a graph is provided which shows the improvement in conductivity at 25% relative humidity of the nano filled sulfonated RADEL® R 5000 in a single layer versus the unfilled sulfonated RADEL® R 5000. The three layer proton exchange membrane shows further improvement in conductivity at 25% relative humidity versus unfilled sulfonated RADEL® R 5000 and the nanoparticle filled sulfonated RADEL® R 5000. All of the sulfonated RADEL® R proton exchange membranes show better performance than the NAFION® at 90° C. and 25% relative humidity. In particular, FIG. 9 shows the improvement in the conductivity at low humidity of a three layer proton exchange membrane versus 1) a single layer of unfilled NAFION® 2) a single layer of sulfonated RADEL® R 5000 and 3) a single layer of sulfonated RADEL® R 5000 with nanoparticles (e.g., sulfonated polyhedral oligomeric silsesquioxane).

Figure 10:
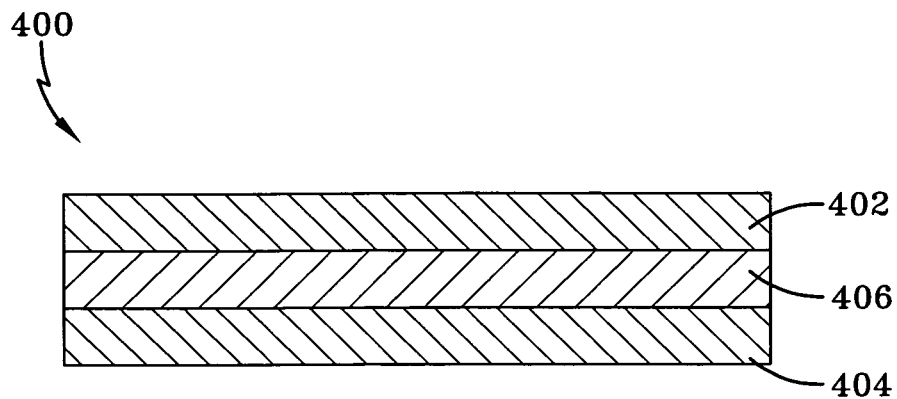
FIG. 10 is a schematic cross-section of a solution cast multilayer membrane in accordance with another additional embodiment of the present invention.

As shown in FIG. 10, a three-layer proton exchange membrane is shown generally at numeral 400. Membrane 400 is provided having the following arrangement. Two outer layers 402, 404 are provided comprising unfilled sulfonated RADEL® R 5000. A middle layer is provided comprising 20% sulfonated polyhedral oligomeric silsesquioxane (S-POSS and 80% sulfonated RADEL® R 5000). All of the proton exchange membranes are 50 microns in total caliper in accordance with this particular embodiment of the present invention. The outer layers 402, 404 have a dry caliper of 10 microns, while the middle layer 406 has a dry caliper of 30 microns. All of the sulfonated RADEL® R 5000 membranes were made from the same lot of material. All of the sulfonated polyhedral oligomeric silsesquioxane was used from the same lot of material.

TABLE 6

Dynamic Mechanical Analysis of Various single layer proton exchange membranes versus a three layer proton exchange membrane.

| Membrane | Storage Modulus at 30° C. (MPa) | Storage Modulus at 120 ®C. (MPa) | Storage Modulus at 170° C. (MPa) |
|---|---|---|---|
| NAFION ® 117 Single Layer | 600 | 50 | 3 |
| S- RADEL ®R 5000 Single Layer + nanoparticle | 1954 | 1750 | 884 |
| S- RADEL ®R 5000 + 20% S- POSS | 1426 | 1120 | 23 |
| Three Layer | 1348 | 1320 | 1202 |

The single layer consists of only sulfonated RADEL®R 5000 at 50 microns in caliper. The single layer+nanoparticle consists of 20% sulfonated polyhedral oligomeric silsesquioxane and 80% sulfonated RADEL® R 5000 at 50 microns in caliper. The three layer consists of two outer layers of only sulfonated RADEL®R 5000 at 10 microns each and a middle layer of 20% sulfonated polyhedral oligomeric silsesquioxane and 80% sulfonated RADEL® R 5000 at 30 microns in caliper. The total caliper is 50 microns.

Table 6 shows a significant reduction in the storage modulus of the filled, proton exchange membrane (see Single layer+nanoparticle[2] above) as temperature is increased to 170° C. However, in the three layer proton exchange membrane (see Three Layer[3]), where the middle layer consists of a conductive polymer and nanoparticles, the storage modulus is consistent across the temperature range studied.

In Plane Conductivity at 90° C. And Various Humidity Levels of Single Versus a Tri-Layer Proton Exchange Membranes.

Practical Application and Manufacture (Pilot Coating) of the Present Invention

Figure 11:
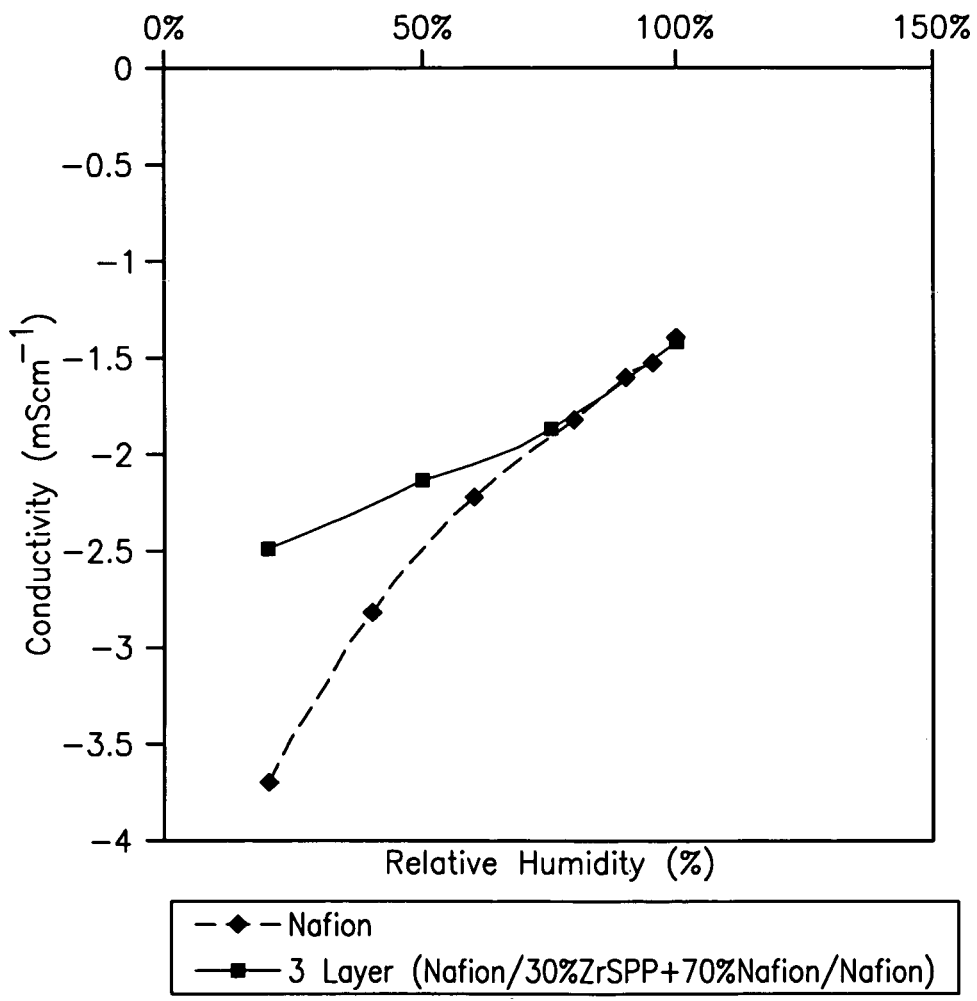
FIG. 11 is a graph showing the relative humidity relative to the conductivity of another embodiment of the present invention.

With reference back to FIG. 5, the solution cast multilayer membrane 500 was cast on a CHEMSULTANTS® pilot coater (designated PC-1). The resulting solution cast membrane 500 comprises outer layers 502, 504, each of which has a dry caliper of 10 microns and a middle layer 506 having a dry caliper of 30 microns. The middle layer 506 comprises 30% ZrSPP and 70% NAFION®. Conductivity studies, as set forth in FIG. 11, at 100° C. and a relative humidity of 25% and 50% showed a remarkable increase in in-plane conductivity. The three layer system 500, in accordance with this particular embodiment of the present invention, was flexible and easily produced coated in a roll to roll format on a CHEMSULTANTS® pilot coater.

Investigate and Evaluate Potentially Suitable Casting Sheet Temporary Carriers to be Used in Membrane Casting Trials. Profile Temperature Capability and Release Characteristics of Various Casting Sheet Materials.

Task A NAFION®

Evaluation of candidate casting sheet materials was performed using a commercial aqueous NAFION® dispersion (10% by weight), DE-1021 from DuPont and a NAFION® solution re-solubilized in dimethylacetamide (DMAC). The following temporary carrier sheet candidate materials were obtained for the purpose of initial benchmarking study:

Fluorinated ethylene propylene (FEP), 5.0 mil
Polymethylpentene (PMP), 2.0 mil
Polyester (MYLAR®), 5.0 mil
Ethylene-chlorotrifluoroethylene (E-CTFE), 1.0 mil
Ethylene-tetrafluoroethylene (ETFE), 5.0 mil
Silicone coated polyester (UV-10 and fluorinated polysiloxane S-10), 3.0 mil
KAPTON® (polyimide), 2.0 mil The aqueous and solvent based NAFION® solutions were cast onto each temporary carrier sheet substrate using an ELCOMETER® bird film applicator and air dried 15 minutes prior to additional drying in a forced air oven for 20 minutes at 93° C. The dried films were subsequently annealed at 135° C. for 20 minutes.

Task B RADEL® R

Casting sheet materials (i.e., the same as those employed above for NAFION®) were reviewed for RADEL® R 5000 solutions in the same manner as previously described for NAFION® solutions. A 25% by weight RADEL® A-100 solution in DMAC was cast onto each temporary carrier sheet substrate using an ELCOMETER® bird film applicator and dried for 15 minutes in a forced air oven at 94° C. The dried films were subsequently dried at 135° C. for 30 minutes to remove the remainder of the DMAC solvent.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A multi-layered composite solution cast membrane comprising a sandwich configuration of layers, said sandwich configuration of layers comprising:

a bottom layer of unfilled conductive polymer electrolyte material having a top side and a bottom side, said bottom layer of unfilled conductive polymer electrolyte material having a dry thickness in the range 5-20 microns for providing mechanical strength to said multi-layered composite solution cast membrane;

a first layer of a doped conductive polymer electrolyte material having a top side and a bottom side, said first layer of a doped conductive polymer electrolyte material being adjacent to said bottom layer at the top side of said of said bottom layer, said first layer of doped conductive polymer electrolyte material having a dry thickness in the range of 5-20 microns and being doped with a plurality of nanoparticles for internal water management of the membrane to achieve a managed level hydration, wherein said plurality of nanoparticles comprises about 0.1% wt. to no more than about 50% wt. based on the dry weight of said first layer of a doped conductive polymer electrolyte material, and wherein said first layer of said doped conductive polymer electrolyte material contains no voids;

a second layer an unfilled conductive polymer electrolyte material having a top side and a bottom side, said second layer of unfilled conductive polymer electrolyte material being adjacent to said first layer of doped conductive polymer electrolyte material at the top side of said of said first layer of doped conductive polymer electrolyte material, said second layer of unfilled conductive polymer electrolyte material having a dry thickness in the range 5-20 microns for providing mechanical strength to said multi-layered composite solution cast membrane;

a second layer of a doped conductive polymer electrolyte material having a top side and a bottom side, said second layer of a doped conductive polymer electrolyte material being adjacent to said second layer of unfilled conductive polymer electrolyte material at the top side of said of said second layer of unfilled conductive polymer electrolyte material, said second layer of doped conductive polymer electrolyte material having a dry thickness in the range of 5-20 microns and being doped with a plurality of nanoparticles for internal water management of the membrane to achieve a managed level hydration, wherein said plurality of nanoparticles comprises about 0.1% wt. to no more than about 50% wt. based on the dry weight of said first layer of a doped conductive polymer electrolyte material, and wherein said second layer of said doped conductive polymer electrolyte material contains no voids; and a top layer of an unfilled conductive polymer electrolyte material adjacent to said second layer of a doped conductive polymer electrolyte material at the top side of said second layer of a doped conductive polymer electrolyte material, said top layer of unfilled conductive polymer electrolyte material having a dry thickness in the range 5-20 microns for providing mechanical strength to said multi-layered composite solution cast membrane;

wherein said unfilled layers and said doped layers comprise a material selected from the group consisting of perfluorosulfonic acid (PFSA) and sulfonated polyphenylsulfone polymers, wherein said nanoparticles comprise at least one selected from the group consisting of zirconium sulphophenyl phosphate and a silsesquioxane cage structure compound and wherein said plurality of nanoparticles are doped in a concentration of from about 0.05-50% in said layers of a doped conductive polymer electrolyte material relative to the other layers of said multi-layer conductive polymer electrolyte material.

2. The multi-layered composite solution cast membrane according to claim 1, wherein said plurality of nanoparticles comprise a distribution selected from the group consisting of hydrophilic nano-sized zirconium sulphophenyl phosphonate particles and sulfonated polyhedral oligomeric silsesquioxane particles.

3. The multi-layered composite solution cast membrane according to claim 1, further comprising a temporary carrier film adjacent to said bottom layer of unfilled conductive polymer electrolyte material on the side opposite that adjacent to said first layer of doped conductive polymer electrolyte material, said temporary carrier film for supporting the balance of said multi-layered solution cast composite membrane during processing of said multi-layered composite solution cast membrane.

4. The multilayered composite solution cast membrane according to claim 3, wherein said temporary carrier film comprises a material selected from the group consisting of a polyester material, aluminum foil polyethylene coated papers, casting papers comprising a specialty high temperature coating being devoid of polyethylene, casting papers having high release silicones and aluminum foil laminates with stable paper substrates.

5. The multilayered composite solution cast membrane according to claim 4, wherein said polyester material is selected from the group consisting of polyethylene terephthalate (PET) and biaxially-oriented polyethylene terephthalate.

6. The multilayered composite solution cast membrane according to claim 1, wherein said layers of doped conductive polymer electrolyte material contain sulfonic acid groups.

7. The multilayered composite solution cast membrane according to claim 1, wherein said multilayered composite membrane comprises a total amount of layers in the range of 3-9 layers and comprises a total thickness in the range of 15-180 microns.

8. The multilayered composite solution cast membrane according to claim 1, wherein each individual layer of said multilayered composite membrane comprises a dry thickness in the range of between 5-20 microns.

9. A multilayered composite solution cast membrane consisting of:
a temporary carrier film for supporting the balance of said multilayered solution cast composite membrane during processing of said multilayered composite solution cast membrane;
at least one layer of an unfilled conductive polymer electrolyte material, wherein one layer of said at least one layer of unfilled conductive polymer electrolyte material is adjacent to said temporary carrier film, and wherein each layer of said at least one layer of unfilled conductive polymer electrolyte material comprises a dry thickness in the range 5-20 microns for providing mechanical strength to said multilayered composite solution cast membrane;
at least one layer of a doped conductive polymer electrolyte material adjacent to said respective at least one layer of conductive polymer electrolyte material, each layer of said doped conductive polymer electrolyte material having a dry thickness in the range of 5-20 microns and being doped with a plurality of nanoparticles for internal water management of the membrane to achieve a managed level hydration, wherein said plurality of nanoparticles comprise about 0.1% wt. to no more than about 50% wt. based on the dry weight of said at least one layer of conductive polymer electrolyte material, and wherein each layer of said at least one layer of doped conductive polymer electrolyte material contains no voids; and
a top layer of conductive polymer electrolyte material having a dry thickness in the range 5-20 microns for providing mechanical strength to said multilayered composite solution cast membrane.

10. The multilayered composite solution cast membrane according to claim 9, wherein said at least one layer of unfilled conductive polymer electrolyte material and said at least one layer of doped conductive polymer electrolyte material are provided in an alternating configuration in said multilayered composite membrane.

11. The multilayered composite solution cast membrane according to claim 9, wherein at least two layers of said at least one layer of doped conductive polymer electrolyte material are provided adjacent to each other in said multilayered composite membrane.

12. The multilayered composite solution cast membrane according to claim 9, wherein said top layer of conductive polymer electrolyte material is a material selected from the group consisting of perfluorosulfonic acid (PFSA) and sulfonated polyphenylsulfone polymers, said top layer of conductive polymer electrolyte material being adjacent to the final layer of said at least one layer of doped conductive polymer electrolyte material.

13. The multilayered composite solution cast membrane according to claim 9, wherein said temporary carrier film comprises a material selected from the group consisting of a polyester material, aluminum foil polyethylene coated papers, casting papers comprising a specialty high temperature coating being devoid of polyethylene, casting papers having high release silicones and aluminum foil laminates with stable paper substrates.

14. The multilayered composite solution cast membrane according to claim 13, wherein said polyester material is selected from the group consisting of polyethylene terephthalate (PET) and biaxially-oriented polyethylene terephthalate.

15. The multilayered composite solution cast membrane according to claim 9, wherein said at least one layer of doped conductive polymer electrolyte material is selected from the group consisting of perfluorosulfonic acid (PFSA), and sulfonated polyphenylsulfone polymers.

16. The multilayered composite solution cast membrane according to claim 15, wherein said at least one layer of doped conductive polymer electrolyte material contains sulfonic acid groups.

17. The multilayered composite solution cast membrane according to claim 16, wherein said at least one layer of doped conductive polymer electrolyte material is selected from the group consisting of perfluorosulfonic acid (PFSA), and sulfonated polyphenylsulfone polymers.

18. The multilayered composite solution cast membrane according to claim 9, wherein said plurality of nanoparticles comprise at least one selected from the group consisting of zirconium sulphophenyl phosphate and a silsesquioxane cage structure compound.

19. The multilayered composite solution cast membrane according to claim 18, wherein said plurality of nanoparticles comprise a distribution selected from the group consisting of hydrophilic nano-sized zirconium sulphophenyl phosphonate particles and sulfonated polyhedral oligomeric silsesquioxane particles.

20. The multilayered composite solution cast membrane according to claim 9, wherein said top layer of a conductive polymer electrolyte material and said at least one layer of doped conductive polymer electrolyte material comprise the same material.

21. The multilayered composite solution cast membrane according to claim 9, wherein said multilayered composite membrane comprises a total amount of layers in the range of 3-9 layers and comprises a total thickness in the range of 15-180 microns.

22. The multilayered composite solution cast membrane according to claim 9, wherein each individual layer of said multilayered composite membrane comprises a dry thickness in the range of between 5-20 microns.

23. The multilayered composite solution cast membrane according to claim 9, wherein said plurality of nanoparticles are doped in a concentration of from about 0.05-50% in at least one layer of doped conductive polymer electrolyte material relative to the other layers of said doped conductive polymer electrolyte material.

24. A process for producing a multilayered composite solution cast membrane consisting of:
- a temporary carrier film for supporting the balance of said multilayered solution cast composite membrane during processing of said multilayered composite solution cast membrane;
- at least one layer of an unfilled conductive polymer electrolyte material, wherein one layer of said at least one layer of unfilled conductive polymer electrolyte material is adjacent to said temporary carrier film, and wherein each layer of said at least one layer of unfilled conductive polymer electrolyte material comprises a dry thickness in the range 5-20 microns for providing mechanical strength to said multilayered composite solution cast membrane;
- at least one layer of a doped conductive polymer electrolyte material adjacent to said respective at least one layer of conductive polymer electrolyte material, each layer of said doped conductive polymer electrolyte material having a dry thickness in the range of 5-20 microns and being doped with a plurality of nanoparticles for internal water management of the membrane to achieve a managed level hydration, wherein said plurality of nanoparticles comprise about 0.1% wt. to no more than about 50% wt. based on the dry weight of said at least one layer of conductive polymer electrolyte material, and wherein each layer of said at least one layer of doped conductive polymer electrolyte material contains no voids; and
- a top layer of conductive polymer electrolyte material having a dry thickness in the range 5-20 microns for providing mechanical strength to said multilayered composite solution cast membrane, said process comprising the steps of:
- providing said temporary carrier film for supporting the balance of said multilayered composite solution cast membrane;
- solution casting a solution of unfilled conductive polymer electrolyte material to said temporary carrier film for forming said at least one layer of unfilled conductive polymer electrolyte material, wherein said soluble unfilled conductive polymer electrolyte material is selected from the group consisting of a crystalline material, a semi-crystalline material and an amorphous material;
- drying said at least one layer of unfilled conductive polymer electrolyte material;
- applying a soluble solution of doped conductive polymer electrolyte material and nanoparticles to said at least one layer of unfilled conductive polymer electrolyte material for forming said at least one layer of doped conductive polymer electrolyte material;
- drying said at least one layer of doped conductive polymer electrolyte material;
- solution casting a solution of unfilled conductive polymer electrolyte material to said at least one layer of doped conductive polymer electrolyte material for forming at least one additional layer of unfilled conductive polymer electrolyte material;
- drying said at least one additional layer of unfilled conductive polymer electrolyte material;
- solution casting a solution of doped conductive polymer electrolyte material and nanoparticles to said at least one additional layer of unfilled conductive polymer electrolyte material for forming at least one additional layer of doped conductive polymer electrolyte material; and
- drying said at least one additional layer of doped conductive polymer electrolyte material.

25. The process according to claim 24, wherein said process comprises solution casting said at least one additional layer of unfilled conductive polymer electrolyte material and said at least one additional layer of doped conductive polymer electrolyte material in an alternating configuration, for forming each of said at least one layer of unfilled conductive polymer electrolyte material, said at least one additional layer of unfilled conductive polymer electrolyte material, said at least one layer of doped conductive polymer electrolyte material and said at least one additional layer of doped conductive polymer electrolyte material.

26. The process according to claim 24, wherein said process comprises the step of solution casting at least two layers of said at least one layer of doped conductive polymer electrolyte material in an adjacent arrangement.

27. The process according to claim 24, wherein said solution casting steps are selected from the group consisting of gravure coating, reverse gravure coating, direct coating, offset coating, micro coating, knife over roll coating, reverse roll coating, slot die coating, micro gravure coating, spray coating and curtain coating.

28. The process according to claim 24, further comprising the steps of:
- solution casting a solution of undoped conductive polymer electrolyte material to the top layer of said at least one additional layer of doped conductive polymer electrolyte material for forming a top layer of unfilled conductive polymer electrolyte material, wherein said soluble unfilled conductive polymer electrolyte material is selected from the group consisting of a crystalline material, a semi-crystalline material and an amorphous material; and
- drying said top layer of unfilled conductive polymer electrolyte material.

29. The process according to claim 28, wherein said solution casting step is selected from the group consisting of gravure coating, reverse gravure coating, direct coating, offset coating, micro coating, knife over roll coating, reverse roll coating, slot die coating, micro gravure coating, spray coating and curtain coating.

30. The process according to claim 24, further comprising the step of annealing said multilayered composite membrane when said layers comprise a material selected from the group consisting of a crystalline material and a semi-crystalline material.

31. The process according to claim 24, further comprising the step of drying said multilayered composite membrane when said layers comprise an amorphous material.

32. The process according to claim 31, wherein said drying step is selected from the group consisting of drying in a convection oven and air-drying, when said layers comprise an amorphous material.

33. The process according to claim 24, wherein said temporary carrier film comprises a material selected from the group consisting of a polyester material, glass, aluminum foil having a thickness in the range of 25-100 microns, polyester coated papers, casting papers comprising a specialty high temperature coating and being devoid of polyester, casting papers having high release silicones and aluminum foil laminates with stable paper substrates.

34. The process according to claim 33, wherein said polyester material is selected from the group consisting of polyethylene terephthalate (PET) and biaxially-oriented polyethylene terephthalate.

35. The process according to claim 24, wherein said at least one layer of unfilled conductive polymer electrolyte material, said at least one additional layer of unfilled conductive polymer electrolyte material and said top layer of unfilled conductive polymer electrolyte material comprise a material selected from the group consisting of perfluorosulfonic acid (PFSA), polyphenylsulfone and tetrafluorethylene copolymers.

36. The process according to claim 24, wherein said at least one layer of doped conductive polymer electrolyte material and said at least one additional layer of doped conductive polymer electrolyte material comprise a material selected from the group consisting of perfluorosulfonic acid (PFSA), polyphenylsulfone and tetrafluorethylene copolymers.

37. The process according to claim 24, wherein said solvent is at least one solvent selected from the group consisting of water, alcohols, aromatics, acetates, N,N-dimethylacetamide (DMAC), tetrahydrofuran (THF), a diethyl ether, N-methylpyrrolidone (NMP), methylene chloride, ketones, and dimethyl sulfoxide (DMSO).

38. The process according to claim 37, wherein said N,N-dimethylacetamide (DMAC) is selected from the group consisting of acetic acid, dimethylamide; dimethyl acetamide and acetyldimethylamine.

39. The process according to claim 24, wherein each of said solution-casting steps comprise solution casting of polymers wherein said solvent is a mixture of at least two true solvents and/or a mixture of at least one true solvent and at least one diluent, wherein said at least one diluent is selected from the group consisting of a low molecular weight alcohol, an aromatic and an acetate.

40. The process according to claim 24, wherein said plurality of nanoparticles is at least one selected from the group consisting of zirconium dioxide, zirconium oxides, clays, zeolytes, silica, compounds of silica, and titanium dioxide.

41. The process according to claim 40, wherein said plurality of nanoparticles comprises a distribution selected from the group consisting of hydrophilic nano-sized zirconium phosphate/phosphonate particles and sulfonated polyhedral oligomeric silsesquioxane.

42. The process according to claim 40, wherein said plurality of nanoparticles comprises a distribution selected from the group consisting of hydrophilic nano-sized zirconium phosphate/phosphonate particles and sulfonated polyhedral oligomeric silsesquioxane.

43. The process according to claim 24, wherein said at least one layer of unfilled conductive polymer electrolyte material, said at least one additional layer of unfilled conductive polymer electrolyte material and said top layer of a unfilled conductive polymer electrolyte material comprise the same material.

44. The process according to claim 24, wherein said multilayered composite membrane comprises a total amount of layers in the range of 3-9 layers and comprises a total thickness in the range of 15-180 microns.

45. The process according to claim 24, wherein said process comprises the step of doping said plurality of nanoparticles in a uniform concentration or in varying concentrations in said at least one layer of doped conductive polymer electrolyte material relative to the other doped layers of said multilayered conductive membrane.

46. The process according to claim 24, wherein the concentration of said plurality of nanoparticles in each doped layer of said multilayered conductive membrane is the same or different.

47. A process for producing a multilayered composite solution cast membrane comprising a sandwich configuration of layers, said sandwich configuration of layers comprising:
a bottom layer of unfilled conductive polymer electrolyte material having a top side and a bottom side, said bottom layer of unfilled conductive polymer electrolyte material having a dry thickness in the range 5-20 microns for providing mechanical strength to said multi-layered composite solution cast membrane;
a first layer of a doped conductive polymer electrolyte material having a top side and a bottom side, said first layer of a doped conductive polymer electrolyte material being adjacent to said bottom layer at the top side of said of said bottom layer, said first layer of doped conductive polymer electrolyte material having a dry thickness in the range of 5-20 microns and being doped with a plurality of nanoparticles for internal water management of the membrane to achieve a managed level hydration, wherein said plurality of nanoparticles comprises about 0.1% wt. to no more than about 50% wt. based on the dry weight of said first layer of a doped conductive polymer electrolyte material, and wherein said first layer of said doped conductive polymer electrolyte material contains no voids;
a second layer an unfilled conductive polymer electrolyte material having a top side and a bottom side, said second layer of unfilled conductive polymer electrolyte material being adjacent to said first layer of doped conductive polymer electrolyte material at the top side of said of said first layer of doped conductive polymer electrolyte material, said second layer of unfilled conductive polymer electrolyte material having a dry thickness in the range 5-20 microns for providing mechanical strength to said multi-layered composite solution cast membrane;
a second layer of a doped conductive polymer electrolyte material having a top side and a bottom side, said second layer of a doped conductive polymer electrolyte material being adjacent to said second layer of unfilled conductive polymer electrolyte material at the top side of said of said second layer of unfilled conductive polymer electrolyte material, said second layer of doped conductive polymer electrolyte material having a dry thickness in the range of 5-20 microns and being doped with a plurality of nanoparticles for internal water management of the membrane to achieve a managed level hydration, wherein said plurality of nanoparticles comprises about 0.1% wt. to no more than about 50% wt. based on the dry weight of said first layer of a doped conductive polymer electrolyte material, and wherein said second layer of said doped conductive polymer electrolyte material contains no voids; and
a top layer of an unfilled conductive polymer electrolyte material adjacent to said second layer of a doped conductive polymer electrolyte material at the top side of said second layer of a doped conductive polymer electrolyte material, said top layer of unfilled conductive polymer electrolyte material having a dry thickness in the range 5-20 microns for providing mechanical strength to said multi-layered composite solution cast membrane;
wherein said unfilled layers and said doped layers comprise a material selected from the group consisting of perfluorosulfonic acid (PFSA) and sulfonated polyphenylsulfone polymers, wherein said nanoparticles comprise at least one selected from the group consisting of zirconium sulphophenyl phosphate and a silsesquioxane cage structure compound and wherein said plurality of nanoparticles are doped in a concentration of from about 0.05-50% in said layers of a doped conductive polymer electrolyte material relative to the other layers of said multi-layer conductive polymer electrolyte material, said process comprising the steps of:

providing a temporary carrier film for supporting the balance of said multilayered composite membrane;

solution casting a solution of unfilled conductive polymer electrolyte material to said temporary carrier film for forming said bottom layer of unfilled conductive polymer electrolyte material;

drying said bottom layer of unfilled conductive polymer electrolyte material;

applying a soluble solution of conductive polymer electrolyte material and nanoparticles to said bottom layer of unfilled conductive polymer electrolyte material for forming a first layer of doped conductive polymer electrolyte material;

drying said first layer of doped conductive polymer electrolyte material;

solution casting a solution of unfilled conductive polymer electrolyte material to said bottom layer of doped conductive polymer electrolyte material for forming said second layer of unfilled conductive polymer electrolyte material;

drying said second layer of unfilled conductive polymer electrolyte material;

solution casting a solution of doped conductive polymer electrolyte material and nanoparticles to said second layer of unfilled conductive polymer electrolyte material for forming said second layer of doped conductive polymer electrolyte material; and drying said second layer of doped conductive polymer electrolyte material.

48. The process according to claim 47, wherein said process comprises solution casting said layers.

49. The process according to claim 47, wherein said solution casting steps are selected from the group consisting of gravure coating, reverse gravure coating, direct coating, offset coating, micro coating, knife over roll coating, reverse roll coating, slot die coating, micro gravure coating, spray coating and curtain coating.

50. The process according to claim 47, further comprising the steps of:

solution casting a solution of unfilled conductive polymer electrolyte material to said second layer of doped conductive polymer electrolyte material for forming a top layer of unfilled conductive polymer electrolyte material; and drying said top layer of unfilled conductive polymer electrolyte material.

51. The process according to claim 50, wherein said solution casting step is selected from the group consisting of gravure coating, reverse gravure coating, direct coating, offset coating, micro coating, knife over roll coating, reverse roll coating, slot die coating, micro gravure coating, spray coating and curtain coating.

52. The process according to claim 47, further comprising the step of annealing said multilayered composite membrane when said layers comprise a material selected from the group consisting of a crystalline material and a semi-crystalline material.

53. The process according to claim 47, further comprising the step of drying said multilayered composite membrane when said layers comprise an amorphous material.

54. The process according to claim 53, wherein said drying step is selected from the group consisting of drying in a convection oven and air-drying.

55. The process according to claim 47, wherein said temporary carrier film comprises a material selected from the group consisting of a polyester material, glass, aluminum foil having a thickness in the range of 25-100 microns, polyester coated papers, casting papers comprising a specialty high temperature coating and being devoid of polyester, casting papers having high release silicones and aluminum foil laminates with stable paper substrates.

56. The process according to claim 55, wherein said polyester material is selected from the group consisting of polyethylene terephthalate (PET) and biaxially-oriented polyethylene terephthalate.

57. The process according to claim 47, wherein said layers of unfilled conductive polymer electrolyte material comprise a material selected from the group consisting of perfluorosulfonic acid (PFSA), polyphenylsulfone and tetrafluorethylene copolymers.

58. The process according to claim 47, wherein said layers of doped conductive polymer electrolyte material comprise a material selected from the group consisting of perfluorosulfonic acid (PFSA), polyphenylsulfone and tetrafluorethylene copolymers.

59. The process according to claim 47, wherein said solvent is at least one solvent selected from the group consisting of water, alcohols, aromatics, acetates, N,N-dimethylacetamide (DMAC), tetrahydrofuran (THF), a diethyl ether, N-methylpyrrolidone (NMP), methylene chloride, ketones, and dimethyl sulfoxide (DMSO).

60. The process according to claim 59, wherein said N,N-dimethylacetamide (DMAC) is selected from the group consisting of acetic acid, dimethylamide; dimethyl acetamide and acetyldimethylamine.

61. The process according to claim 47, wherein each of said solution-casting steps comprises solution casting of polymers wherein said solution is a mixture of at least two true solvents and/or a mixture of at least one true solvent and at least one diluent, wherein said at least one diluent is selected from the group consisting of a low molecular weight alcohol, an aromatic and an acetate.

62. The process according to claim 47, wherein said plurality of nanoparticles is at least one selected from the group consisting of zirconium dioxides, zirconium oxides, clays, zeolytes, silica, compounds of silica, and titanium dioxide.

63. The process according to claim 47, wherein said layers of unfilled conductive polymer electrolyte material comprise the same material.

64. The process according to claim 47, wherein said multilayered composite membrane comprises a total amount of layers in the range of 3-9 layers and comprises a total thickness in the range of 15-180 microns.

65. The process according to claim 47, wherein said process comprises the step of doping said plurality of nanoparticles in a uniform concentration or in varying concentrations in said layers of doped conductive polymer electrolyte material relative to the other doped layers.

66. The process according to claim 47, wherein the concentration of said plurality of nanoparticles in each doped layer is the same or different.

* * * * *